(12) United States Patent
Ito

(10) Patent No.: US 6,888,886 B2
(45) Date of Patent: May 3, 2005

(54) INTERFACE APPARATUS AND METHOD FOR RECEIVING SERIALLY-TRANSMITTED DATA

(75) Inventor: Masahiro Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 747 days.

(21) Appl. No.: 09/799,972

(22) Filed: Mar. 6, 2001

(65) Prior Publication Data

US 2001/0033629 A1 Oct. 25, 2001

(30) Foreign Application Priority Data

Mar. 6, 2000 (JP) ........................................ 2000-060072
Mar. 6, 2000 (JP) ........................................ 2000-060073

(51) Int. Cl.[7] ........................ H04B 17/00; H04L 27/28; H04L 7/00
(52) U.S. Cl. ........................ 375/225; 375/260; 375/355
(58) Field of Search ........................ 375/225, 355–373, 375/260–295; 370/229–282

(56) References Cited

U.S. PATENT DOCUMENTS

| | | | | |
|---|---|---|---|---|
| 5,010,559 A | * | 4/1991 | O'Connor et al. | 375/368 |
| 5,297,181 A | * | 3/1994 | Barr et al. | 375/373 |
| 5,534,929 A | * | 7/1996 | Tanaka | 375/240.03 |
| 5,878,079 A | * | 3/1999 | Mori | 375/225 |
| 5,928,342 A | * | 7/1999 | Rossum et al. | 710/74 |
| 6,044,307 A | * | 3/2000 | Kamiya | 700/94 |
| 6,072,781 A | * | 6/2000 | Feeney et al. | 370/282 |
| 6,658,310 B1 | * | 12/2003 | Kamiya | 700/94 |

OTHER PUBLICATIONS

Design of a SPDIF receiver using Protocol Compiler; Holtmann, U.; Blinzer, P.; Design Automation Conference, 1998. Proceedings, Jun. 15–19, 1998; pp.:794–799.*

* cited by examiner

Primary Examiner—Amanda T. Le
Assistant Examiner—Cicely Ware
(74) Attorney, Agent, or Firm—Pillsbury Winthrop LLP

(57) ABSTRACT

Serially transmitted digital data are received in a predetermined format such as an SPDIF format. In the format, identification data are incorporated in the serial data in predetermined cycles. Generation of a train of bit-extracting pulses having a predetermined pulse generation pattern is triggered by detection of a pulse edge of the received serial data. By counting the bit-extracting pulses, bit location information is generated which identifies each bit location in the received serial data. Each identification data is detected from among the received digital data and the number of detections of the identification data within a predetermined time period is calculated, so as to identify a transmission rate of the digital data on the basis of the number of detections.

18 Claims, 11 Drawing Sheets

| | 3T | 2T | T | EXAMPLE: $a = 128$; $b = 512$; $c = 4$ |
|---|---|---|---|---|
| a | 12 t<br>488.3 ns | 8 t<br>325.5 ns | 4 t<br>162.8 ns | $Fs = 48\,kHz$ |
| b | 13.1 t<br>531.5 ns | 8.7 t<br>354.3 ns | 4.4 t<br>177.2 ns | $Fs = 44.1\,kHz$ |
| c | 18 t<br>732.4 ns | 12 t<br>488.3 ns | 6 t<br>244.1 ns | $Fs = 32\,kHz$ |

TABLE I

| | | (P) NUMBER OF SUBFRAMES | (Q) ESTIMATION OF NUMBER OF 3T DETECTIONS | THRESHOLD C2 |
|---|---|---|---|---|
| A | Tc = 166.7 μs : 48kHz/8 | (P) | (Q) | C2 |
| | a) fs = 48 kHz | 16 | $(16^{+1}_{-1} \times 1.5) \pm 1$ | 21~27 |
| | b) fs = 44.1 kHz | 14.7 | $(14^{+1}_{-0} \times 1.5) \pm 1$ | 20~24 |
| | c) fs = 32 kHz | 10.7 | $(10^{+1}_{-0} \times 1.5) \pm 1$ | 14~18 |
| B | Tc = 333.3 μs : 48kHz/16 | (P) | (Q) | C2 |
| | a) fs = 48 kHz | 32 | $(32^{+1}_{-1} \times 1.5) \pm 1$ | 46~51 |
| | b) fs = 44.1 kHz | 29.4 | $(29^{+1}_{-0} \times 1.5) \pm 1$ | 42~46 |
| | c) fs = 32 kHz | 21.3 | $(21^{+1}_{-0} \times 1.5) \pm 1$ | 30~34 |
| C | Tc = 500 μs : 48kHz/24 | (P) | (Q) | C2 |
| | a) fs = 48 kHz | 48 | $(48^{+1}_{-1} \times 1.5) \pm 1$ | 69~75 |
| | b) fs = 44.1 kHz | 44.1 | $(44^{+1}_{-0} \times 1.5) \pm 1$ | 63~69 |
| | c) fs = 32 kHz | 32 | $(32^{+1}_{-0} \times 1.5) \pm 1$ | 45~51 |
| D | Tc = 666.7 μs : 48kHz/32 | (P) | (Q) | C2 |
| | a) fs = 48 kHz | 64 | $(64^{+1}_{-1} \times 1.5) \pm 1$ | 93~99 |
| | b) fs = 44.1 kHz | 58.7 | $(58^{+1}_{-0} \times 1.5) \pm 1$ | 86~90 |
| | c) fs = 32 kHz | 42.7 | $(42^{+1}_{-0} \times 1.5) \pm 1$ | 62~66 |

TABLE II

FIG. 4

INTERFACE APPARATUS AND METHOD FOR RECEIVING SERIALLY-TRANSMITTED DATA

BACKGROUND OF THE INVENTION

The present invention relates to an interface apparatus and method for receiving digital data transmitted at any one of a plurality of predetermined transmission rates, and a method and apparatus for identifying the transmission rate of the digital data.

There have been known various systems which handle a signal of a digital transmission format that is transmitted at any one of a plurality of predetermined transmission rates and is in the form of a series of pulses having their respective time lengths or widths (durations) limited within a predetermined range to thereby form patterns of pulse widths peculiar to the signal. Among examples of such systems are high-density recording/reproduction apparatus using the baseband digital modulation scheme to record and reproduce data to and from storage media at a variable rate.

Further, EIAJ (Electronic Industries Association of Japan) Standard CP1201 for use in general-purpose digital audio interfaces has been widely known as an example of an interface system related to such high-density recording/reproduction apparatus. In the field of the digital audio data interfacing, this format is commonly known as the "SPDIF (acronym for Sony, Philips Digital audio Interface)" format and defined in detail in the EIAJ/CP1201 digital audio interface specifications.

In systems using such a transmission format, there would occur no problem in an apparatus that records or transmits signals because the recording or transmitting apparatus itself decides a transmission rate of the signals. However, an apparatus that reproduces or receives the signals would encounter the problem that the reproducing or receiving apparatus can neither apply a phase-locked loop (PLL) nor detect data of each bit unless the transmission rate of the signals is first identified. There have heretofore been known a number of schemes for identifying a signal transmission rate. But, all of the conventionally-known transmission rate identifying schemes are very simple and directed only to counting a length of the peculiar pulse width pattern of the signal using a high-speed clock. As a result, the pulse-width pattern length has to be counted using a considerably high frequency.

In the case of conventional SPDIF signal reception circuits, it has been common to use an analog PLL to generate clock pulses that are in phase with the SPDIF signal and have a frequency corresponding to a multiple of the frequency of the SPDIF signal. Also, there have been proposed and developed various methods and apparatus in relation to the analog-PLL-based SPDIF signal reception circuits and the scheme of locking the PLL. If a sufficiently high frequency is used, similar circuits can be implemented even with a digital PLL.

Although the use of the analog PLL can construct an SPDIF signal reception circuit without using a very high frequency, the greatest concern of a system provided with the SPDIF reception circuit is signal synchronization between the system and the SPDIF reception circuit. If the system is a standalone or independent type based primarily on the SPDIF reception circuit, there would arise no inconvenience. But, in a situation where the SPDIF signal reception is employed as an additional function of an apparatus that processes another type of digital audio signal and when digital mixing is to be performed between the main digital audio signal and the SPDIF signal, the system master clock pulses must be temporarily shifted to reproduce clock pulses produced by an analog PLL locking the SPDIF signal, at which moment there would occur an undesirable interruption in the main digital audio processing.

Typically, where two or more different SPDIF signals are to be received and processed simultaneously, it would be impossible to generate one type of master clock pulse that is synchronous with all of the different SPDIF signals. Thus, in such a situation, digital sampling rate converter circuits are provided in corresponding relation to the different SPDIF signals so that all the input data can be processed with only one type of master clock pulse.

If the received SPDIF signal is merely delivered to another interface for subsequent data transmission to a digital controller, instead of being subjected to audio reproduction, the signal synchronization is no longer the primary concern, but how to communicate the data without data duplication and omission becomes the most important challenge. In this case, it is only necessary that the apparatus provided with the SPDIF signal reception circuit should function as a master apparatus that, whenever data is received, carries out data delivery through a handshake scheme using flags.

In these examples of the SPDIF processing, provision of the analog PLL should be no longer necessary, and there is a great demand for a more sophisticated SPDIF signal reception circuit which can operate stably with low-frequency asynchronous master clock pulses without using the analog PLL and which yet can be of a small circuit size or scale.

SUMMARY OF THE INVENTION

According to one aspect of the present invention, there is provided an interface apparatus for receiving digital data serially transmitted in a predetermined format where predetermined identification data are incorporated in serial digital data in predetermined cycles, and the interface apparatus comprises: a pulse train generation circuit that generates a bit-data extracting pulse train, having predetermined pulse generation patterns, in response to detection of a variation in received serial digital data; a bit-location information generation circuit that, on the basis of the bit-data extracting pulse train generated by the pulse train generation circuit, generates bit location information specifying each bit location in the received serial digital data; a bit-data extraction circuit that extracts data of each bit from the received serial digital data by use of the generated bit-data extracting pulse train; an identification data detection circuit that detects the identification data from the data extracted by the bit-data extraction circuit; a control device that is adapted to set a locked state at least on condition that the bit location information generated by the bit-location information generation circuit when the identification data is detected by the identification data detection circuit corresponds to a predetermined bit location, and generate a lock status signal in correspondence with setting of the locked state; and a data reproduction circuit that, on the basis of the data of each bit extracted by the bit-data extraction circuit and with reference to the bit location information, reproduces the received serial digital data on condition that the lock status signal is indicative of the locked state.

The present invention also provides an interface apparatus for receiving digital data serially transmitted in a predetermined format where predetermined identification data are incorporated in serial digital data in predetermined cycles, and the interface apparatus comprises: a pulse train generation circuit that generates a bit-data extracting pulse train, having predetermined pulse generation patterns, in response to detection of a variation in received serial digital data; a bit-location information generation circuit that, on the basis of the bit-data extracting pulse train generated by the pulse train generation circuit, generates bit location information specifying each bit location in the received serial digital data; a bit-data extraction circuit that extracts data of each bit from the received serial digital data by use of the generated bit-data extracting pulse train; an identification data detection circuit that detects the identification data from the data extracted by the bit-data extraction circuit; and a data reproduction circuit that, on the basis of the data of each bit extracted by the bit-data extraction circuit and with reference to the bit location information, reproduces the received serial digital data. Here, the bit location information generated by the bit-location information generation circuit is modified in response to detection of the identification data by the identification data detection circuit.

In the present invention, the predetermined format may be an SPDIF signal format, in which case the identification data is preamble data for each subframe of an SPDIF signal. However, it should be appreciated that the basic principles of the present invention are applicable to any other desired serial transmission formats than the SPDIF signal format.

The bit location information generated by the bit-location information generation circuit may be modified in response to detection of the identification data by the identification data detection circuit. The pulse train generation circuit generates the bit-data extracting pulse train having pulse generation patterns corresponding to the serial transmission rate of the signal.

According to another aspect of the present invention, there is provided a method for receiving digital data transmitted at any one of a plurality of predetermined transmission rates and identifying the transmission rate of the received digital data, identification data of peculiar patterns being incorporated in the transmitted digital data repetitively in predetermined cycles, an actual time length of the predetermined cycles depending on the transmission rate, and the method comprises the steps of: detecting the identification data by extracting the peculiar patterns from the received digital data; calculating a number of detections of the identification data within a predetermined time period; and identifying the transmission rate of the received digital data on the basis of the number of detections of the identification data calculated by the step of calculating.

The present invention also provides a method for receiving digital data transmitted at any one of a plurality of predetermined transmission rates and identifying the transmission rate of the received digital data, identification data of peculiar patterns being incorporated in the transmitted digital data repetitively in predetermined cycles, an actual time length of the predetermined cycles depending on the transmission rate, the peculiar patterns being in the form of data patterns having a plurality of types of pulse-width pattern lengths, and the method comprises the steps of: measuring the pulse-with pattern lengths of the individual data patterns present in the received digital data, by use of predetermined clock pulses; detecting, from among the pulse-width pattern lengths measured by the step of measuring, a predetermined type of pulse-width pattern length present in the peculiar patterns and extracting the peculiar patterns in accordance with detection of the predetermined type of pulse-width pattern length, to thereby detect the identification data; calculating a number of detections of the identification data within a predetermined time period; and identifying the transmission rate of the received digital data on the basis of the number of detections of the identification data and a measured value of the predetermined type of pulse-width pattern length.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the control device or processor used in the present invention may comprise a dedicated processor or control device with dedicated logic built in hardware, rather than a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the objects and other features of the present invention, its embodiments will be described in greater detail hereinbelow with reference to the accompanying drawings, in which:

FIG. 4 is a diagram showing another table explanatory of a procedure for setting a second threshold value to be used in connection with the transmission-rate identifying algorithm of the present invention;

DETAILED DESCRIPTION OF EMBODIMENTS

[General Explanation of the Invention]

Figure 1A:
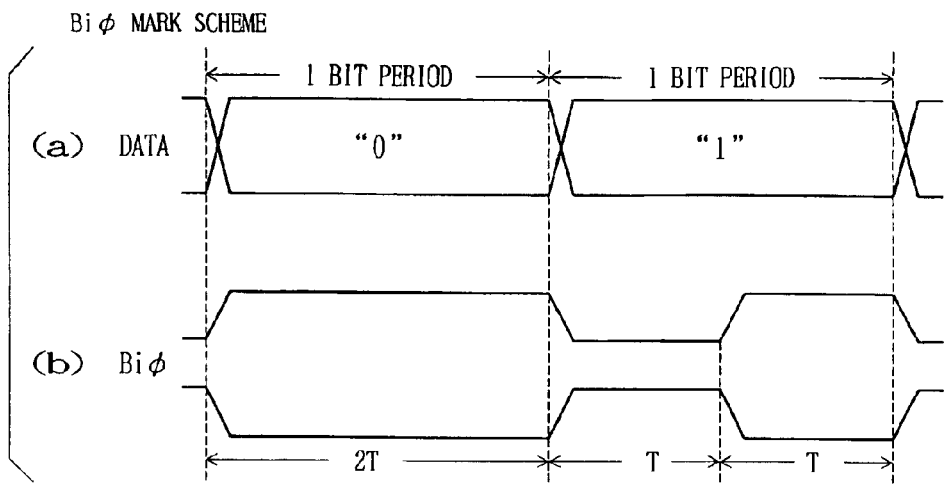
FIGS. 1A–1C are diagrams explanatory of a signal transmission format ("SPDIF format") to which the present invention is applicable.

According to one embodiment of the present invention, there is provided an interface apparatus for receiving an SPDIF signal. This interface apparatus includes a pulse train generation circuit for generating a bit-data-extracting pulse train at predetermined timing on the basis of detection of a data variation point in the received SPDIF signal, a counter for counting the number of bit data in SPDIF signal on the basis of the generated bit-data-extracting pulse train, and a preamble detection circuit for detecting preamble data from among the data extracted from the SPDIF signal on the basis of the bit-data-extracting pulse train. The interface apparatus also includes a section for decoding a preamble detection signal output from the preamble detection circuit to thereby modify the counted value and counting timing of the above-mentioned counter, and a status output section for identifying a locked state at least on condition that the preamble detection signal has been generated when the counter has reached a predetermined count value and then outputting a first lock status signal. Note that in this generation explanation of the invention, most reference characters in parentheses correspond to reference characters used in the subsequent detailed description of the invention and in the accompanying drawings.

Namely, in the interface apparatus of the present invention, the pulse train generation circuit generates a bit-data extracting pulse trains (pa/pb) at predetermined timing on the basis of detected data variation points in the received SPDIF signal. The counter (B counter) counts the number of bit data in the received SPDIF signal by use of pulses (Cd) corresponding to the generated bit-data extracting pulse train. Then, a preamble pattern is decoded on the basis of the bit-data extracting pulse train, so that the counted value and counting timing or phase of the counter are modified in accordance with the decoded preamble pattern. If the preamble pattern has been detected when the counter has reached a predetermined count value (i.e., preamble detection flag f=High level), a locked state is identified to thereby generate a first lock status signal (first status flag S=High level).

Thus, in applications where different digital data, such as SPDIF signals, likely to be transmitted at a plurality of predetermined different signal transmission rates are received, the present invention can provide an interface apparatus of a small circuit size or scale which can identify the transmission rate of each of the received SPDIF signals using asynchronous master clock pulses of a lower fixed frequency, without using an analog PLL, accurately detect data bits, monitor the operation of the circuitry through a locked/unlocked state identifying function, and thereby operate in a stable and optimal manner.

In the embodiments described hereinbelow, the terms "SPDIF" are used only for convenience of description; however, the terms should be interpreted as referring to not only the standardized SPDIF format but also other digital audio formats having characteristics similar to those of the standardized SPDIF format. Accordingly, the present invention should never be construed as being limited only to the interface apparatus for receiving the standardized SPDIF signals alone.

Further, in the present invention, the locked and unlocked state may distinguished from each other by detecting two preamble data in succession and on the basis of a result of parity calculation after modulation, and upon detection of the second one of the two preambles, the locked state may be identified on condition that the parity calculation result for the preceding subframe is appropriate, to thereby output a first lock status signal (S1) of the High level. The interface apparatus of the present invention further includes a rate identification section for identifying a rate of the input SPDIF signal by counting a longest pulse width pattern (3T) of the SPDIF signal, and a switch may be made between two bit-data extracting pulse trains (pa/pb) output from the timing generation circuit, in accordance with the identified rate of the input SPDIF signal. Note that "T" such as in 3T represents a minimum unit time used to represent lengths of pulse widths of the input signal. The transmission rate identification section may have, in addition to the rate identification function, an additional function for identifying rates of signals of other formats than the SPDIF format.

According another feature of the embodiment, the data of the "C" bits, which are channel status bits, are detected when the first status signal represents the locked state, and after a predetermined number of the "C" bit data have been detected, a second status signal is output. When the second status signal (i.e., second status flag S2) represents an unlocked state (S2=Low level), all the data to be output are muted or preset. Namely, the data of the "C" bits are detected only when the first status signal is in the locked state (Si=High). Before the predetermined number of the "C" bit data have been detected, the interface apparatus does not identify an ultimate locked state where the second status flag too represents the locked state (S1 and S2=High level), so that the SPDIF data are muted.

According to still another feature of the embodiment, the transmission rate identification section detects only the 32 kHz transmission rate to switch between the bit-data extracting pulse trains (pa/pb) in accordance with the detected result, but uses a same bit-data extracting pulse train (pa) for the transmission rates of 48 kHz and 44.1 kHz. According to still another feature, transmission rate information of the transmitted SPDIF signal is obtained by decoding the "C" bit data, and a comparison is made between the thus-obtained transmission rate information and the transmission rate identified by counting the maximum 3T pulse width pattern in the preamble of the SPDIF signal. If the compared two transmission rates do not agree or coincide with each other, then a flag indicative of the disagreement is generated.

Namely, in the embodiment of the present invention, the data can be accurately extracted and demodulated by use of the master clock pulses asynchronous to the SPDIF signal without using an analog PLL based on a VCO (Voltage Controlled Oscillator) or the like. For this purpose, the embodiment has novel structural and functional features to be described below. It should be obvious that the intended purpose may be accomplished by only implementing the master clock pulses by reproduced clock pulses synchronous with the SPDIF signal using an analog PLL while leaving the overall structural setup unchanged.

To be more specific, the SPDIF signal receiving interface apparatus according to the embodiment of the present invention includes a timing generation circuit, a circuit for identifying a transmission rate of the SPDIF signal, a bit data extraction and preamble detection circuit, a parity checker, a data demodulation circuit, a PCM data extraction circuit, a PCM data separation circuit, and a "C" bit data detection circuit. The SPDIF signal receiving interface apparatus may also include a flag generation circuit for testing a status lock that is a state in which the above-mentioned circuits are operating in such a manner as to accurately extract the transferred data of the transmitted SPDIF signal.

Characteristic operation of the embodiment is as follows. First, the timing generation circuit decodes a counted output of a counter ("A" counter) that counts up with the master clock pulses and is reset in response to detection of a data variation point in the SPDIF signal, to thereby generate two different bit-data extracting pulse trains (pa and pb) corresponding to the 32 kHz SPDIF signal transmission rate and other SPDIF signal transmission rates than 32 kHz. Then, the transmission rate identification circuit determines the transmission rate of the SPDIF signal, using a predetermined threshold value, in accordance with the counted output of the A counter indicative of the number of the longest pulse width patterns of the SPDIF signal. The timing generation circuit, in response to the transmission rate identified by the transmission rate identification circuit, selects either one of the above-mentioned two different bit-data extracting pulse trains depending on whether the identified transmission rate is 32 kHz or not.

Further, the transmission rate identification circuit can also detect pulse widths outside the range between the maximum and minimum pulse-width pattern lengths of an SPDIF signal (i.e., outside the criterion of the SPDIF format). Once such a pulse width outside the range of the SPDIF format is detected, the status information (S1 and S2) generated by the flag generation circuit is set to the unlocked state.

The interface apparatus includes another counter (B counter) that counts up with a clock pulse train (SPDIF-signal demodulating clock pulses Cd) corresponding to the above-mentioned bit-data extracting pulse trains generated by the timing generation circuit. The bit data extraction and preamble detection circuit extracts the data from the SPDIF signal by use of the bit-data extracting pulse train and also detects a preamble signal from the extracted data. Preamble detection signal (Dpa) thus generated by the bit data extraction and preamble detection circuit detecting the preamble signal is passed to the B counter, so as to modify the count timing of the B counter and preset a predetermined count value in the B counter. When the preamble is detected at the same time the B counter has reached a predetermined count value, the detected preamble is judged to be a correctly detected preamble (f→High level). If the preamble can not be detected at the same time the B counter has reached the predetermined value, the status information (S1 and S2) generated by the flag generation circuit is both set to the unlocked (Low level) state.

When two preambles have been detected correctly in succession and if a parity check performed on the subframe of the SPDIF signal on the basis of the first or preceding one of the two detected preambles has yielded a correct result at the time of detection of the second or succeeding preamble, the first status information (S1) generated by the flag generation circuit is shifted from the unlocked state to the locked state (S1→High level).

The "C" bit detection circuit performs its detection operation only when the first status information (S1) generated by the flag generation circuit represents the locked state (S1= High level), and once the detection of the predetermined number of the "C" bit data has been completed, the second status information (S2) generated by the flag generation circuit is set to the locked state (S2→High level). When the second status information is in the unlocked state (S2=Low level), the detected "C" bit signals are preset to a fixed value, and at the same time, PCM data extracted by the PCM data separation circuit are also muted.

Further, the transmission rate (Fs) identified by the transmission rate identification circuit is compared to transmission rate information obtained by decoding the "C" bit signals detected by the "C" bit data extraction circuit. If the compared two transmission rates do not agree with each other, then the flag generation circuit generates a third or error flag (Se) indicative of the disagreement.

In one embodiment of the present invention, there are provided transmission rate identification circuitry which includes a first counter for measuring lengths of peculiar pulse width patterns (1T–3T patterns) in an input SPDIF signal by use of clock pulses of a fixed frequency, a first comparator circuit for comparing the measured lengths of the peculiar pulse with patterns to first threshold values (C1x) to identify a predetermined pulse-with pattern length, a second counter for calculating the number of times the predetermined pulse-with pattern length has been detected via the first comparator circuit (i.e., the number of the predetermined pulse-with pattern lengths detected) within a predetermined time period, a second comparator circuit for comparing the calculated number of times to a second threshold value, and an output circuit for outputting a signal indicative of the transmission rate of the received SPDIF signal on the basis of the calculated number of times. Namely, in this embodiment, the lengths of the peculiar pulse with patterns (1T–3T patterns) in the SPDIF signal are measured using the clock pulses of the fixed frequency to identify the predetermined pulse-with pattern length, the number of times the predetermined pulse-with pattern length has been detected within the predetermined time period (Tc) is determined, and the transmission rate of the received SPDIF signal is identified on the basis of the thus-identified number of times the predetermined pulse-with pattern length has been detected (i.e., the number of the predetermined pulse-with pattern lengths detected) within the predetermined time period (Tc).

Because the transmission rate identification scheme of the present invention is designed to identify the transmission rate of the received SPDIF signal by not only determining the pulse-with pattern lengths based on the predetermined first threshold values (C1x) but also counting the number of occurrences of the predetermined pulse-with pattern length within the predetermined measuring time period (Tc). Thus, the identification of the pulse-with pattern length and transmission rate can be implemented using a lower frequency. In this case, if a too-small or too-great pulse-width pattern length that normally can never occur in the SPDIF format has been measured, it is preferable that the number-of-times calculating operation be reset in order to restart the operations for measuring the pulse-with pattern lengths and counting the number of occurrences of the predetermined pulse-with pattern length within the predetermined measuring time period.

More specifically, the length of any desired one of the peculiar pulse width patterns (3T pattern) is measured by use of the clock pulses of the fixed frequency (fc). Then, a first count value (n) indicative of the measured pulse-width pattern length is compared to the first threshold values (Cx), preset in corresponding relation to the possible transmission rates, to thereby determine, in a pattern length detection step, that the thus-measured pulse-width pattern length represented by the first count value (n) is a predetermined pulse-width pattern length (C12<n C11).

Then, a second count value (m) indicative of the number of detections of the predetermined pulse-width pattern length within the predetermined measuring time period (Tc) is compared to second threshold values (C2), preset in corresponding relation to the possible transmission rates, so as to determine, in a number-of-time calculation step, a specific value range which the second count value (m) falls in. Namely, the transmission rate of the received SPDIF signal is identified by determining how many times the predetermined pulse-with pattern length has occurred within the predetermined time period (Tc).

In an alternative, one or more possible transmission rates of the SPDIF signal are estimated by measuring lengths of the peculiar pulse-with patterns on the basis of the first threshold values (C1x). If one of the measured pulse-with pattern lengths is determined as being the predetermined pulse-with pattern length (e.g., 10≦n≦15), a determination is made, on the basis of the second threshold value (C2) of, e.g. 92, as to which range the second count value (m) of the predetermined pulse-with pattern length belongs to. Then, the transmission rate of the received digital interface signal is ultimately identified on the basis of the estimation of the possible transmission rates based on the first threshold values (C1x) and the number of detections of the predetermined pulse-with pattern length based on the second threshold value (C2).

Further, there may be preset minimum (shortest) and maximum (longest) pulse-with pattern lengths (Cmin and Cmax) that normally can never occur in the SPDIF format. If the first count value (n) is smaller than the minimum pulse-with pattern length (Cmin) (i.e., excessively small) or greater than the maximum pulse-with pattern length (Cmax) (i.e., excessively great), an error flag is generated instantly, and at the same time, the operation for getting the second count value with respect to the second threshold value (C2) is reset so as to restart the counting within the predetermined measuring time period (Tc).

Further, a transmission rate identification method in accordance with an embodiment of the present invention is applied to a digital interface for reproducing a digital interface signal transmitted at any one of a plurality of predetermined transmission rates, and this method is characterized by comprising: a step of measuring respective lengths of peculiar pulse width patterns present in the transmitted digital interface signal by use of clock pulses of a fixed frequency; a step of detecting a predetermined pulse-width pattern length from the measured pulse-width pattern lengths; a step of calculating the number of detections of the predetermined pulse-width pattern length (i.e., the number of the detected predetermined pulse-width pattern lengths) within a predetermined time period; a step of identifying the calculated number of detections of the predetermined pulse-width pattern length; and a step of identifying the transmitted rate of the transmitted digital interface signal.

Further, based on the inventive transmission rate identification method, there is provided a transmission rate identification apparatus that is applied to a digital interface for reproducing a digital interface signal transmitted at any one of a plurality of predetermined transmission rates, and this apparatus is characterized by comprising: a first counter for measuring respective lengths of peculiar pulse width patterns present in the transmitted digital interface signal by use of clock pulses of a fixed frequency; a first comparator circuit for comparing the detected pulse-width pattern lengths with a first threshold value so as to detect a predetermined pulse-width pattern length from the measured pulse-width pattern lengths; a second counter for calculating the number of detections of the predetermined pulse-width pattern length (i.e., the number of the detected predetermined pulse-width pattern lengths) within a predetermined time period; a second comparator circuit for comparing the calculated number of detections of the predetermined pulse-width pattern length to a second threshold value so as to identify the calculated number of detections; and an output circuit for, on the basis of the identified number of detections, outputting a signal indicative of the transmission rate of the transmitted digital interface signal.

In the digital interface of the present invention, to which a digital interface signal is likely to be transmitted at the plurality of predetermined transmission rates, a length of an optionally selected one of the peculiar pulse width patterns present in the digital-format signal is measured by use of the clock pulses of the fixed frequency. Then, a first count value indicative of the thus-measured pulse-width pattern length is examined on the basis of first threshold values, preset in corresponding relation to the possible transmission rates, to thereby determine whether the thus-measured pulse-width pattern length is a predetermined pulse-width pattern length to be preset as a condition for identifying the transmission rate of the digital-format signal.

Then, a second count value (m) indicative of the number of detections of the predetermined pulse-width pattern length within the predetermined measuring time period (Tc) is compared to the second threshold values (C2), preset in corresponding relation to the possible transmission rates, so as to determine a specific value range which the second count value (m) falls in. Namely, the transmission rate of the received digital interface signal is identified by determining how many times the predetermined pulse-with pattern length has occurred within the predetermined time period (Tc).

Transmission rate identification method in accordance with another embodiment of the present invention can also be advantageously applied to a digital interface for reproducing a digital interface signal transmitted at any one of a plurality of predetermined transmission rates, and this method is characterized by comprising: a step of measuring respective lengths of peculiar pulse width patterns present in the transmitted digital interface signal by use of clock pulses of a fixed frequency; a step of detecting a predetermined pulse-width pattern length from the measured pulse-width pattern lengths; a step of calculating the number of detections of the predetermined pulse-width pattern length (i.e., the number of the detected predetermined pulse-width pattern lengths) within a predetermined time period; a step of identifying the calculated number of detections of the predetermined pulse-width pattern length; and a step of identifying the transmitted rate of the transmitted digital interface signal on the basis of the detected predetermined pulse-width pattern length or the number of detections of the predetermined pulse-width pattern length.

In another embodiment of the transmission rate identification method, when the pattern length detection step has detected an excessively small or excessively great pulse-width pattern length that normally can never occur in the digital interface format of interest, control is performed such that the operation in the number-of-detection calculation step is reset so as to restart the counting and calculation of the number of detections within the predetermined measuring time period.

In this case, one or more possible transmission rates of the signal are estimated by determining the pulse-with pattern lengths, and a predetermined pulse-with pattern length that may belong to the estimated transmission rates is detected. Then, in the number-of detection calculation step, a determination is made, on the basis of the second threshold value, as to which range the second count value of the predetermined pulse-with pattern length falls in. Then, the transmission rate of the received digital interface signal is ultimately identified on the basis of a combination of the estimation of the possible transmission rates based on the first threshold values and the number of detections of the predetermined pulse-with pattern length based on the second threshold value. Further, minimum and maximum great pulse-width pattern lengths that normally can never occur in the digital interface format of interest are present as the first threshold values, so that when the first count value represents a length smaller than the minimum great pulse-width pattern length (i.e., excessively small length) or greater than the maximum pulse-width pattern length (i.e., excessively great length), an error flag is generated instantly, and at the same time, control is performed such that the operation of getting the second count value with respect to the second thresholds is reset so as to restart the counting within the predetermined measuring time period.

Now, specific embodiments of the present invention will be described in detail with reference to the accompanying drawings.

[SPDIF Format]

Figure 1B:
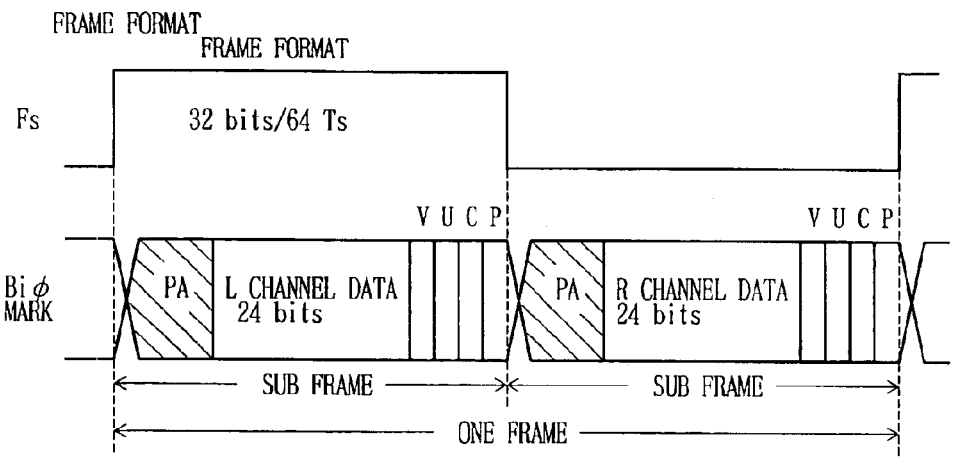
Figure 1C:
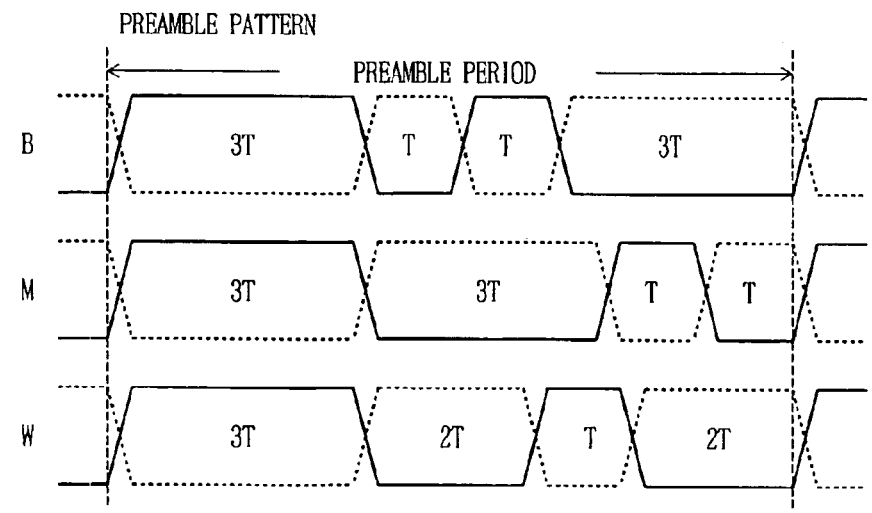

Before proceeding to the detailed description of the specific embodiments, the following paragraphs set forth a an existing signal transmission format and frequency to be used for identifying a transmission rate of a signal transmitted in the format. FIGS. 1A to 1C show an SPDIF format that is a format used for the above-mentioned "EIAJ-CP1201" digital audio interface.

In data of the SPDIF format, bit data "0" or "1" per bit rate or bit period (time slot consisting of two unit times 2T) shown in (a) of FIG. 1A is transmitted in one type of FM-modulated format, i.e., after having been subjected to a sort of FM modulation called a "biphase (Biφ), mark" modulation. According to the biphase mark modulation scheme, the bit data "0" maintains a same state for the entire time slot (bit-period corresponding pulse-width pattern length) 2T, while the bit data "1" changes from one state to another at a midpoint between the two unit times (i.e., upon lapse of a minimum pulse-width pattern length 1T). Namely, the signal transmitted here presents pulse-width patterns comprising the bit-period corresponding pulse-width pattern length 2T and minimum or shortest pulse-width pattern length 1T that is one half of the bit-period corresponding pulse-width pattern length 2T, and the data "0" and "1" in the individual time slots are transmitted in the form of pulse-width pattern lengths 2T and T, respectively.

Further, for the purpose of transmitting digital audio data of two stereo channels, each frame, corresponding to a period determined by an audio signal sampling rate Fs, is composed of two 32-bit subframes of left and right channels (Lch and Rch), as shown in FIG. 1B. In each of the 32-bit subframes (i.e., each channel data set), pure audio data occupy 24 bits, and redundancy data V, U, C and P are allocated to the last four bits. The redundancy data bits consist of a parity flag bit V, user data bit U, channel status (control information) bit C and parity bit P. In the illustrated example of FIG. 1, a set of the channel status bits in 192 frames constitutes one block.

As also shown in FIG. 1B, a preamble signal PA, intended for reproduction synchronization, is added to the first four bits in each of the channel data sets (i.e., subframes). This preamble signal PA is a special data pattern that does not correspond to the modulation rules of the biphase (Biφ) mark modulation scheme explained above in relation to FIG. 1A. As shown in FIG. 1C, each of the preamble signal PA has any one of three types of pulse-width patterns "B", "M" and "W", each of which includes one or two maximum or longest pulse-width pattern lengths 3T each three times as long as the minimum or shortest pulse-width pattern length T. The preamble signal of the "B" pulse width pattern indicates that the subframe containing that preamble is the leading or foremost one of the subframes that correspond to one block of the "C" bits (i.e., control-information-bearing bits) dispersed across 192 frames. The preamble signals of the "M" and "W" pulse width patterns are imparted to the other subframes than such a leading or foremost subframe; that is, the preamble signal of the "M" pulse width pattern is located at the beginning of each subframe of the left channel data, and the preamble signal of the "W" pulse width pattern is located at the beginning of each subframe of the left channel data.

As noted above, each frame is composed of two subframes of the left and right channels within one sampling period Fs. Thus, according to this transmission format, the longest pulse width pattern to be used here is defined by the maximum pulse-width pattern length 3T, while the shortest pulse with pattern is defined the minimum pulse-width pattern length 1T. Also, the actual signal transmission rate is "a×Fs=2(channels)×32(bits)×2(T)×Fs=128 Fs; therefore, "a" in this case equals 128. For example, where Fs=48 kHz, the actual transmission rate, which depends on the signal transmission rate Fs, is 6.1 MHZ (with the minimum pulse-width pattern length 1T being about 163 ns). If the value of the signal transmission rate being used is to be identified by use of a lowest possible clock frequency, it will be most advantageous to measure the maximum pulse-width pattern length 3T in the preamble PA.

However, in a situation where there are used three different signal transmission rates Fs of 48 kHz, 44.1 kHz and 32 kHz, the pulse-width pattern length must be measured with a measuring clock frequency of at least 46 MHZ, from the viewpoint of common sense, if errors resulting from asynchronousness (asynchronousness error) of the clock pulses to the input signal are allowed for. This is because the 48 kHz and 44.1 kHz transmission rates, considerably close to each other in frequency, can be distinguished from each other by the counts of the clock pulses, only when the 3T pattern length at the 48 kHz transmission rate is 488 ns and the count obtained by counting with the 46 MHZ measuring frequency is "22" or "23" while the 3T pattern length at the 44.1 kHz transmission rate is 531 ns and the count obtained by counting with the same 46 MHZ measuring frequency is "24" or "24".

[Transmission-rate Identifying Algorithm]

Figure 2:
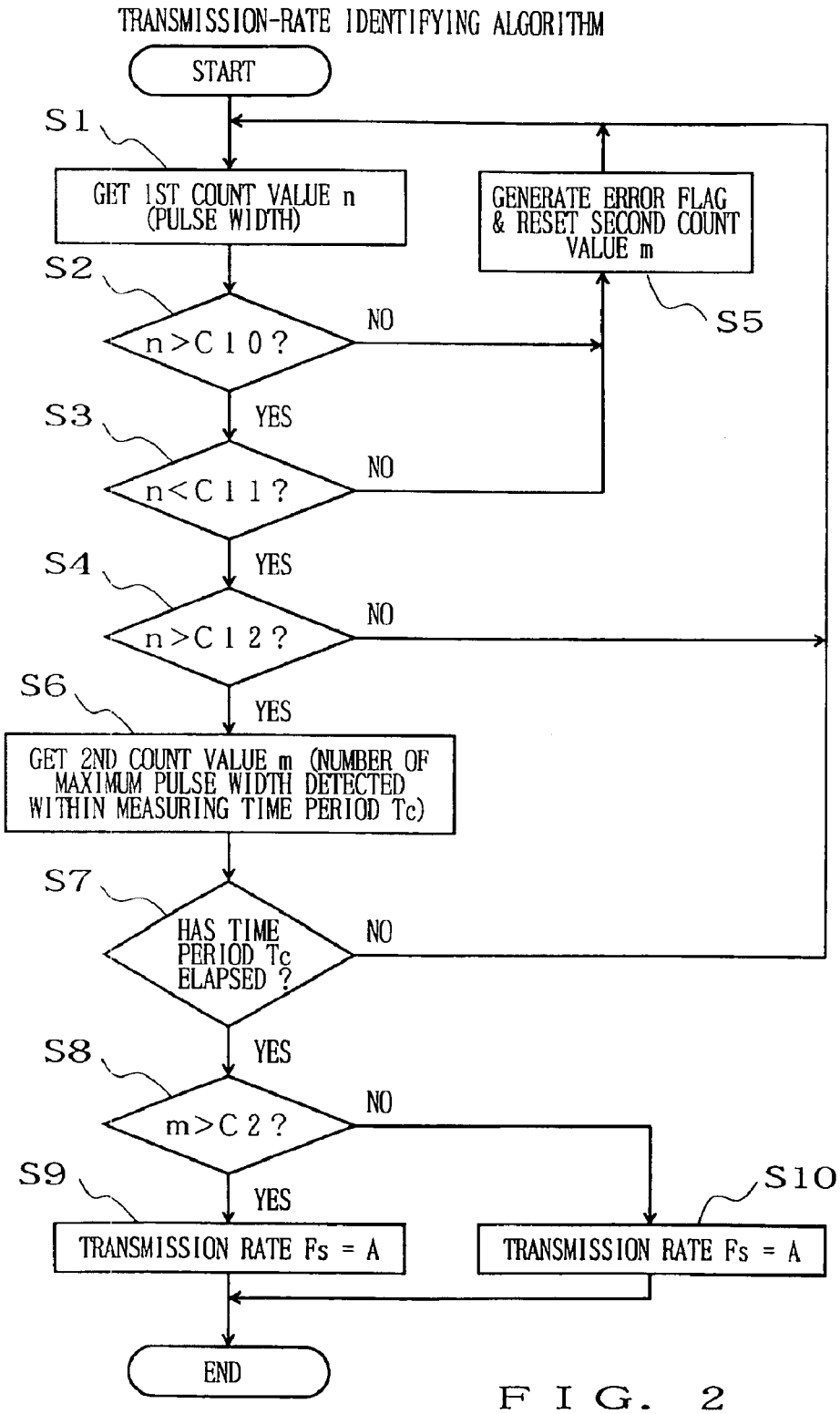
FIG. 2 is a flow chart explanatory of a transmission-rate identifying algorithm in accordance with one embodiment of the present invention.

According to one embodiment of the present invention, the fixed frequency of the pattern-length measuring clock pulses can be lowered by employing an algorithm in accordance with which a transmission rate of a received signal is identified by not only counting a length of a peculiar pulse width pattern in the signal received by the digital interface (e.g., longest pulse-width pattern 3T in the SPDIF format signal) but also counting the number of occurrences of the peculiar pulse width pattern 3T. FIG. 2 is a flow chart explanatory of one embodiment of such a transmission-rate identifying algorithm.

First, at step S1, pulse-width pattern lengths in the input signal are measured by counting, as first count values n, with a predetermined fixed clock frequency fc. The first count value n, which is determined at step S1 for each of the pulse-width pattern lengths to be measured, is sequentially compared to a set of first threshold values C1x (=C10–C12) at following steps S2 to S4.

The first threshold value C1x (=C10) to be used at step S2 is a value smaller than a minimum count value Cmin obtained by counting a predetermined minimum pulse-width pattern length by use of the fixed clock frequency fc (i.e., C10<Cmin). Thus, in a situation where the data in question is data of the predetermined format, it is determined at step S2 that the first count value n is greater than the threshold value C10 (Cn>C10), and then the algorithm proceeds to next step S3. If the first count value n is not greater than the threshold value C10 as determined at step S2, it judges the data to be an error, so that the algorithm branches to step S5. The first threshold value C1x (=C11) to be used at step S3 is a value greater than a maximum count value Cmax obtained by counting a predetermined maximum pulse-width pattern length by use of the fixed clock frequency fc (i.e., C11>Cmax). Thus, in a situation where the data in question is data of the predetermined format, it is determined at step S3 that the first count value n is smaller than the threshold value C11 (Cn<C11), and the algorithm proceeds to step S4. If the first count value n is not smaller than the threshold value C11 as determined at step S3, it judges the data to be an error, so that the algorithm branches to step S5. At step S5, an error flag is generated, and a second count value m (to be described later) is reset.

Further, the first threshold value C1x (=C12) to be used at step S4 is a value greater than a count value Cmax2 obtained by counting a second longest pulse-width pattern length by use of the fixed clock frequency fc (i.e., Cmax2<C12>Cmax). If the first count value n is greater than the threshold value C12 (Cn>C12) as determined at step S4, the algorithm proceeds to step S6, but if not, the algorithm loops back to step S1. Because steps S6 is taken only when a condition of C12<n<C11 has been met, i.e. only when the longest pulse-width pattern has been detected, the number of detections of the longest pulse width pattern (i.e., the number of detected maximum pulse-width pattern lengths detected) is counted up by one via another counter as the second count value m.

At next step S7, a determination is made as to whether or not a preset given sufficiently-long measuring time period Tc has elapsed. If answered in the negative at step S7, the algorithm loops back to step S1 so as to repeat the second-count-value measuring operations of steps S1, S2, S3, S4 and S6 until the measuring time period Tc elapses. Upon lapse of the measuring time period Tc, the algorithm goes from step S7 to step S8. At step S8, the second count value m is compared to a second threshold value C2. If the second count value m is greater than the second threshold value C2 (m>C2) as determined at step S8, the algorithm moves on to step S9 so as to identify the transmission rate Fs of the input signal to be rate A; otherwise, the algorithm moves on to step S9 to determine that the transmission rate Fs of the input signal is rate B, after which the current execution of the transmission-rate identifying algorithm is brought to an end.

Of course, the above-mentioned measuring time period Tc and second threshold value C2 are set so as to permit appropriate identification of the signal transmission rate Fs. For example, where the transmission format is one having a predetermined pulse width pattern occurring only once per frame and the signal transmission rate Fs is either one of 48 kHz and 44.1 kHz, and if the measuring time period Tc is set to 1 kHz (1 ms.), the number of detections of the predetermined pulse width pattern (i.e., second count m) should be determined as "48" in the case of the 48 kHz signal, while the number of detections of the predetermined pulse width pattern should be determined as "44" in the case of the 44 kHz signal. Thus, the 48 kHz signal transmission rate and 44 kHz signal transmission rate can be accurately distinguished from each other, by the second threshold value C2 being set to about "46" with asynchronousness errors taken into account. Further, where three or more different signal transmission rates are to be identified, there may be used a plurality of such second threshold values C2.

Because the signal transmission rate is identified, in the instant embodiment, on the basis of the result of determining the number of detections or occurrences of the pulse-width pattern satisfying the first threshold values C1x within the predetermined measuring time period Tc, rather than by using the first threshold values C1x alone, the instant embodiment can identify the signal transmission rate by use of the fixed measuring clock frequency fc lower than commonly conceivable measuring clock frequencies. Further, because the clock pulses for extracting individual bit data at the fixed measuring clock frequency fc can be generated in a digital manner, the embodiment can implement an appropriate data extraction circuit without using an analog PLL. Thus, in practice, it is possible to reduce electric power consumption, and ensure operational margins by the use of the lower measuring clock frequency and operational stability by the use of the digital circuit arrangements.

[Procedure for Setting First Threshold Values]

Figures 3A, 3B:
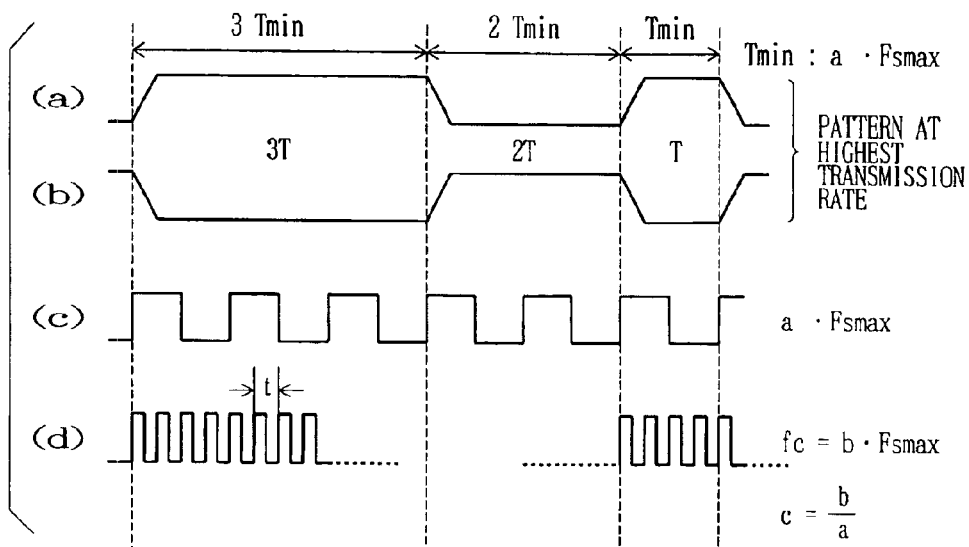
FIGS. 3A and 3B are diagrams showing a waveform and table explanatory of a procedure for setting first threshold values to be used in connection with the transmission-rate identifying algorithm of the present invention.

The following paragraphs describe an exemplary scheme for setting the first threshold values in the case where the embodiment of the transmission rate identifying algorithm is applied to reception of the SPDIF format signal as described above in relation to FIG. 1. FIG. 3A is a waveform diagram explanatory of the scheme for setting the first threshold values to be used for the transmission rate identification of the present invention, and FIG. 3B is a diagram explanatory of an exemplary table I to be used for the transmission rate identification. In columns (a) and (b) of FIG. 3A, there are illustrated two sets of three pulse-width patterns 3T, 2T and 1T (3T=3Tmin, 2T=2Tmin and 1T=Tmin) corresponding to a signal transmission rate Fsmax (e.g., 48 kHz) that is the highest of several possible signal transmission rates such as 48 kHz, 44.1 kHz and 32 kHz. Further, the clock frequency fc to be used for the signal transmission rate identification is fixed to a value of "b·Fsmax" (e.g., b=512, fc=24.576 MHZ=512×48 kHz) as shown in column (d) of FIG. 3A; although not clear from the figure, the clock pulses are completely asynchronous to the SPDIF signal to be identified.

Each input signal to the interface apparatus includes three different types of pulse width patterns 3T, 2T and 1T, as shown in columns (a) and (b) of FIG. 3A, and these pulse-width pattern lengths 3T, 2T and 1T are most important for the transmission rate identification of the invention; polarities of the pulse width patterns are not important for the transmission rate identification of the invention. As noted earlier, the input signal, whose individual bit data are to be extracted, has a frequency "a" times as high as the minimum pulse length 1T, i.e. the signal transmission rate Fs. Further, at least the condition "a·Fsmax" must also be satisfied for the highest possible signal transmission rate Fsmax as shown in (c) of FIG. 3A, and clock pulses for extracting the individual data from the input signal must be generated from the fixed clock frequency fc shown in column (d) of FIG. 3A.

Thus, for example, "a" may be set to 128 and "b" may be set to 512 for the maximum signal transmission rate Fsmax. In this case, the ratio c (b/a) of the clock frequency fc to the minimum pulse length 1T (=Tmin) at the maximum signal transmission rate Fsmax amounts to "4" C=4), so that the period t of the measuring clock pulses of the fixed frequency fc, as shown in column (d) of FIG. 3A, amounts to Tmin/c (=Tmin/4).

Assuming that the measuring clock frequency fc is synchronized with the signal transmission rate Fs for simplicity of description about the procedure for setting the individual threshold values, there will be generated counted values of the pulse-width pattern lengths 3T, 2T and T at the signal transmission rates Fs of 48 kHz, 44.1 kHz and 32 kHz in relation to the above-mentioned examples of the numerical values (a=128, b=512 and c=4), and the counted values based on that assumption and numerical values are shown at boxes a, b and c in the table I of FIG. 3B. If the transmission rate Fs of the SPDIF signal is asynchronous to the fixed clock frequency fc, consideration must be given to asynchronous errors that would occur at various points. For example, such asynchronous errors would occur within a range of about±one clock pulse (Ck) depending on whether the measuring clock pulses of the frequency fc (=512 Fsmax) are slightly faster or slower than the frequency "a·128 Fs" of the SPDIF signal due to a difference in the precision of quartz oscillation.

Thus, in the case where the detection is made of the maximum pulse-with pattern length 3T and if table I of FIG. 3B is used, the first count value n capable of being generated with the fixed clock frequency fc will be 12±1 (i.e., 11 to 13) for the signal transmission rate Fs of 48 kHz (box a of table I shown in FIG. 3B), 13+1 (i.e., 13 or 14) for the signal transmission rate Fs of 44.1 kHz (box b of table I), and 18±1 (i.e., 17 to 19) for the signal transmission rate Fs of 32 kHz (box c of table I). Thus, the signal transmission rates of 48 kHz and 44.1 kHz overlap each other in the measurable first count value n and can not be accurately distinguished from each other.

[Procedure for Setting Second Threshold Value]

In view of the foregoing, the present invention also employs another approach where the number of detections of the maximum pulse width pattern 3T within a predetermined measuring time period Tc is determined using a second threshold value C2. FIG. 4 shows table II explanatory of the procedure for setting the second threshold value C2 for the signal transmission rate identification of the present invention. In this table II, there are shown the number of the subframes (P), number of detections of the maximum pulse width pattern 3T (Q) and second threshold value C2 at each of the three signal transmission rates Fs of 48 kHz (a), 44.1 KHz (b) and 32 kHz (c), in relation to several cases (case A to case D) where the measuring time period Tc is set to "k" (=8, 16, 24 and 32) times as long as one period corresponding to the maximum signal transmission rate Fsmax of 48 kHz, i.e. where the measuring time period Tc is set to 166.7 μs, 333.3 μs, 500 μs and 666.7 μs. From the table, it is seen that the signal transmission rates of 48 kHz and 44.1 kHz can be distinguished from each other with the second threshold value C2 by expanding the measuring time period Tc to such an extent that the "k" value reaches 32, i.e. that the measuring time period Tc amounts 666.7 μs (if expressed in frequency, 48 kHz/32=1.5 kHz).

Other than the approach of setting the second threshold value C2 in accordance with the number of detections of the maximum pulse width pattern 3T, there may be used another approach where the number of detections of the preamble (i.e., the number of the preambles detected) is set as the second threshold value C2. In this case, because the preamble can be detected once for every subframe as mentioned earlier, the second threshold value C2 may be set to "46" with the measuring time period Tc set to one ms (1 kHz frequency).

[Specific Example of Transmission-rate Identifying Algorithm]

Figure 5:
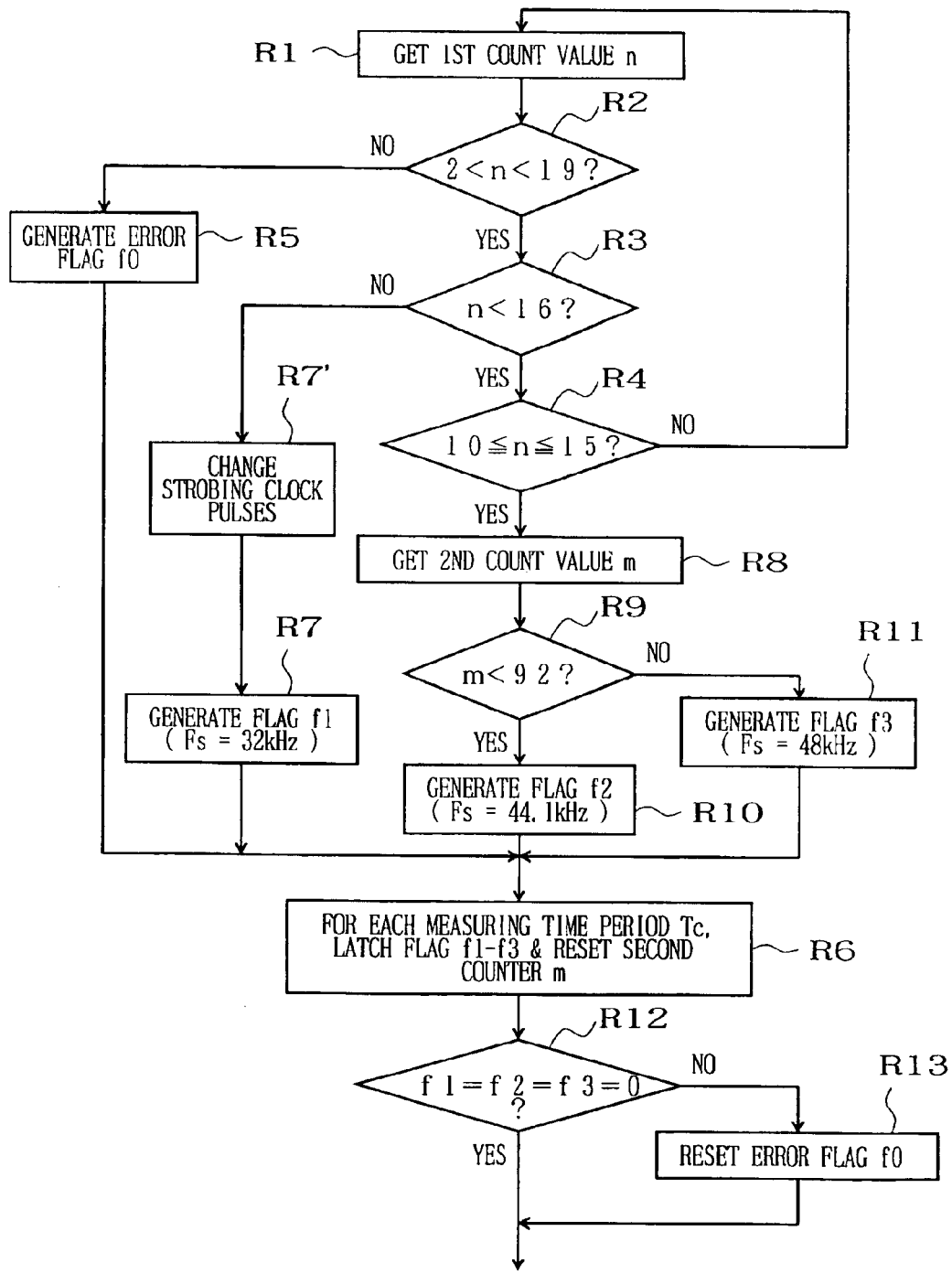
FIG. 5 is a flow chart showing a more specific example of the transmission-rate identifying algorithm of the present invention.

FIG. 5 shows a more specific example of the transmission-rate identifying algorithm of the present invention. At step R1, first count values n are obtained for the individual pulse-width pattern lengths using the first threshold values C1x. At steps R2 to R4, the following comparisons are made for each of the pulse-width pattern lengths in a sequential manner. Namely, at step R2, it is determined whether a condition of 2<n<19 is met, i.e. whether the first count value n is greater than 2 but smaller than 19. With an affirmative determination at step R2, the algorithm goes to step R3. If n<2 or n≧19, this means that a pulse-width pattern outside the range between the maximum and minimum pulse-width pattern lengths 3T and T has been input, so that the algorithm branches from step R2 to step R5 in order to treat the input as an error. For example, the determination at step R2 can identify a state where no signal is being input. Thus, the algorithm sets an error flag f0 at step R5, and then moves to step R6 in order to reset a later-described operation for calculating the second count value m (i.e., a function of step R8).

At step R3, it is further determined whether the first count n is smaller than 16 (n<16). If answered in the affirmative at step R3, the algorithm proceeds to step R4; otherwise, i.e. if n≧16 (i.e., 16≦n≦18), the algorithm branches to step R7, where the signal transmission rate Fs is judged to be "32 kHz" only on the basis of the determinations having been made so far and a first state flag f1 indicating the "Fs=32 kHz" state is set. After step R7, the algorithm goes to step R6. In this case, step R7' may be added between steps R3 and R7, as denoted in broken lines, so as to perform an operation for demodulating the bit data of the received SPDIF signal; more specifically, step R7' may be inserted to change data-bit-demodulating strobe clock pulses (see later-described bit-data-extracting pulse trains p1 and p2). At step R4 taken from the affirmative determination (n<16) of step R3, a further determination is made as to whether a condition of 10≦n≦15 is met. With an affirmative answer at step R4, the algorithm proceeds to step R8; otherwise, the algorithm reverts to step R1.

If the condition of 10≦n≦15 is met at step R4, this means that the maximum pulse-width pattern length 3T at the signal transmission rate Fs of 48 kHz or 44.1 kHz has been detected, and thus a second count value m corresponding to the second threshold value C2 is obtained at step R8. Here, the second count value m is determined by a counting operation of an "B" counter within the measuring time period Tc of 666.7 μs (1.5 kHz). At next step R9, the thus-obtained second count value m is compared to the second threshold value C2 of "92". If the second count value m is smaller than 92 as determined at step R9, the algorithm proceeds to step R10, where the signal transmission rate Fs is judged to be 44.1 kHz and a second state flag f2 indicating the "Fs=44.1 kHz" state is set. After step R10, the algorithm goes to step R6. If the second count value m is not smaller than 92, the algorithm branches from step R9 to step R11, where the signal transmission rate Fs is judged to be 48 kHz and a third state flag f3 indicating the "Fs=48 kHz" state is set. After step R11, the algorithm goes to step R6. Namely, the signal transmission rates Fs of 48 kHz and 44.1 kHz can be distinguished from each other by ascertaining whether the second count value m is greater or smaller than the second threshold value "92".

At step R6, the results obtained at steps R7, R10 and R11 are latched and then output every measuring time period Tc, and also the B counter for generating the second count value m is reset to the initial zero value. At next step R12, a determination is made as to whether any one of the first to third state flags f1, f2 and f3 is currently set, i.e. whether there is currently caused no error. If answered in the affirmative at step R12, the error flag f0 is reset.

[Transmission Rate Identification and Data Extraction Circuitry]

Figure 6:
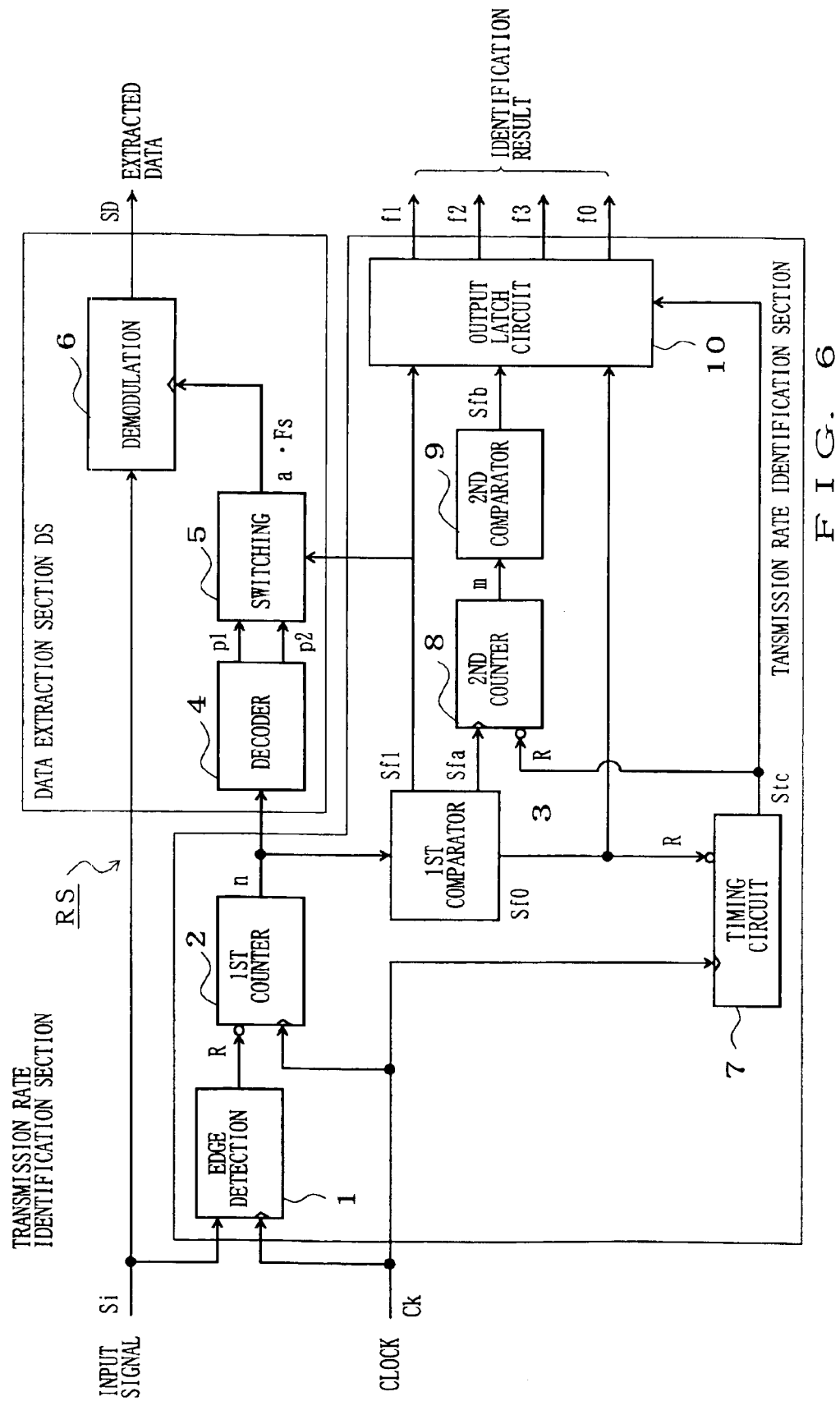
FIG. 6 is a diagram showing transmission rate identification and data extraction circuitry in accordance with an embodiment of the present invention.

FIG. 6 shows an embodiment of transmission rate identification and data extraction circuitry of the present invention, which is designed to execute the above-described transmission-rate identifying algorithm. As shown, the transmission rate identification and data extraction circuitry RS includes a variation-point detection circuit 1 for detecting a variation point (edge) of an input signal Si, a first counter 2 for measuring lengths of pulse width patterns in the input signal Si, a first comparator circuit 3 for comparing the output of the first counter 2 to the first threshold values C1$x$, a decoder 4, a switching circuit 5, and a demodulation circuit 6. The transmission rate identification and data extraction circuitry RS also includes a timing circuit 7 for generating a measurement timing signal to set a measuring time period Tc, a second counter 8 for counting the number m of detections of the longest pulse-width pattern length (i.e., the number of the longest pulse-width pattern lengths detected), a second comparator circuit 9 for comparing the output of the second counter 8 to the second threshold value C2, and an output latch circuit 10 for latching the output states from the comparator circuits 3 and 9 every measuring time period Tc. The circuits 1 to 3 and 7 to 10 together constitute a transmission rate identification section RD, and the circuits 4 to 6 together constitute a data extraction section DS.

Each input signal Si is a modulated signal of the SPDIF format, and clock pulses Ck have a fixed frequency fc of 24.576 MHz similarly to the above-mentioned case. The variation-point detection circuit 1 uses the clock pulses Ck to detect each variation point (edge) of a pulse wave in the input SPDIF signal Si, and the first or pulse-width pattern length measuring counter 2 counts a length between successive detected variation points of the pulse width pattern in the signal Si using the clock pulses Ck.

The first count value n output from the first counter 2 represents a duration or length of a predetermined pulse width pattern occurring in the input signal Si, and is compared via the first comparator circuit 3 to the predetermined first threshold values C1$x$ (C10 to C12). Simultaneously, the first count value n from the first counter 2 is passed to the decoder 4, which, on the basis of the first count value n and in relation to possible or estimated transmission rates Fs of the input signal Si, generates two trains p1 and p2 of timing pulses of frequencies a·Fs (=128 Fs) for extracting each preamble and bit data of the input signal Si.

More specifically, the decoder 4 can provide two different bit-data extracting pulse trains p1 and p2 corresponding to 1) the 32 kHz transmission rate Fs and 2) other transmission rates Fs of 48 kHz and 44.1 kHz. Either one of the two bit-data-extracting pulse trains p1 or p2 is selected by the switching circuit 5 and sent to the demodulation circuit 6. Which of the bit-data-extracting pulse trains p1 and p2 should be selected by the switching circuit 5 depends on whether or not the transmission rate Fs has been identified as 32 kHz as a result of examination of the first count value n. That is, when the 32 kHz transmission rate Fs has been identified, the bit-data extracting pulse train p1 corresponding to the 32 kHz transmission rate Fs is selectively output via the switching circuit 5; otherwise, the other bit-data extracting pulse train p2 is selectively output via the switching circuit 5. Then, using the bit-data extracting pulse train p1 or p2, the demodulation circuit 6 demodulates the biphase (Biφ) mark modulation of the input SPDIF signal Si and extracts the demodulated data after converting the serial data to parallel form, so as to output extracted data SD.

The first comparator circuit 3 compares the first count value n to the minimum value "3", maximum value "18" and intermediate values "10" and "16". The first comparator circuit 3 outputs an error signal Sf0 to the timing circuit 7 and latch circuit 10 if n<3 or n>18, or outputs a first identification signal Sf1 indicative of the 32 kHz transmission rate to the timing circuit 7 and latch circuit 10 if 16≦n≦18. Further, if 10≦n≦16, the first comparator circuit 3 outputs a second identification signal Sfa indicative of the 48 kHz and 44.1 kHz transmission rates to the timing circuit 7 and latch circuit 10. The number of times the second identification signal Sfa is generated is counted, as a second count value m, by the second counter 8.

The measuring time period Tc, with which the number of times the second identification signal Sfa is generated is counted, is set by a measurement timing signal generated by the timing circuit 7 dividing the frequency of the clock pulses Ck. In this example, the timing circuit 7 outputs the measurement timing signal Stc of 1.5 kHz to the second counter 8 so that the counter 8 counts the number of generations of the second identification signal Sfa within the measuring time period Tc. The second count value m, measured within the measuring time period Tc thus set by the measurement timing signal Stc, is given from the second counter 8 to the second comparator circuit 9, where it is compared to the second threshold value C2 of "92" in order to determine whether the signal transmission rate Fs is 48 kHz or 44.1 kHz. Thus, the second comparator circuit 9 outputs to the latch circuit 10 a third identification signal Sfb indicative of the determined result, 48 kHz or 44.1 kHz.

The latch circuit 10 latches the identification signal Sf0, Sf0, Sf1 or Sfb every measurement time period Tc in response to the timing signal Stc given from the timing circuit 7, and then the latch circuit 10 outputs the corresponding state data f0–f3 at predetermined timing. For example, the latch circuit 10 outputs the error flag f0 or first state flag f1 in response to the error signal Sf0 or first identification signal Sf1 from the first comparator circuit 3, or outputs the second or third state flag f2 or f3 in response to the value (Fs=48 kHz or 44.1 kHz) indicated by the third identification signal Sfb from the second comparator circuit 9.

Figure 7:
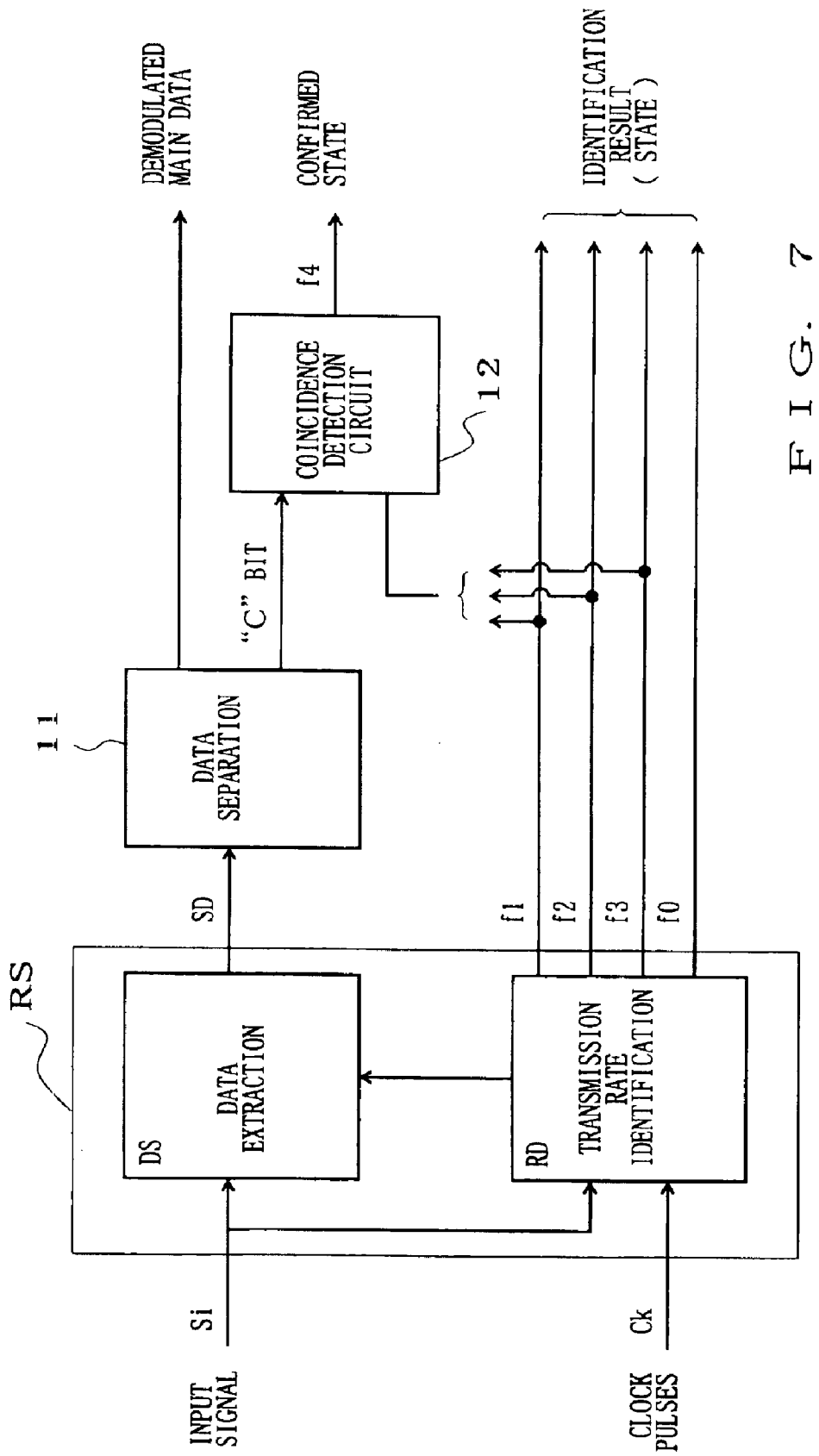
FIG. 7 is a block diagram showing another embodiment of the transmission rate identification and data extraction circuitry.

FIG. 7 is a block diagram showing another embodiment of the transmission rate identification and data extraction circuitry RS of the present invention. As with the embodiment of FIG. 6, the transmission rate identification and data extraction circuitry RS of FIG. 7 comprises two major sections, transmission rate identification section RD and data extraction section DS. The transmission rate identification section RD includes a variation-point detection circuit 1, a first counter 2 for measuring a length of a predetermined pulse width pattern in an input signal Si, a first comparator circuit 3 for comparing the output of the first counter 2 to the first threshold values C1$x$, a timing circuit 7 for generating a measurement timing signal to set a measuring time period Tc, a second counter 8 for counting the number of detections of the predetermined pulse width pattern in the input signal, a second comparator circuit 9 for comparing the output of the second counter 8 to the second threshold value C2, and an output latch circuit 10, etc. The transmission rate identification section RD can output any one of error and first to third state flags f0 to f3 in accordance with an identification result. The data extraction section DS includes a decoder 4, a switching circuit 5, a demodulation circuit 6, etc. and outputs extracted data SD by demodulating the biphase mark modulation of the input SPDIF signal.

In the embodiment of FIG. 7, the extracted data SD from the transmission rate identification and data extraction circuitry RS are separated into PCM (Pulse-Code-Modulated)

main data and "C" bit data. The "C" bit data thus separated are passed to a coincidence detection circuit 12. The coincidence detection circuit 12 decodes the "C" bit data and extracts signal transmission rate information incorporated in the "C" bit data [24th to 27th bits (24th to 27th frames)]. Then, the coincidence detection circuit 12 compares the extracted signal transmission rate information with state information indicative of any one of the state flags f1 to f3 having been output from the transmission rate identification and data extraction circuitry RS as a result of the transmission rate identification by the transmission rate identification section RD. Thus, the coincidence detection circuit 12 outputs a state confirmation flag f4 indicating whether or not the signal transmission rate information and state information matches each other. When the state confirmation flag f4 is at a value "1" or at a High level, it indicates that the signal transmission rate information and state information matches each other, so that normal operation of the system can be confirmed by the flag f4.

The signal transmission rate information and state information should, of course, always match each other, but the identified result (f1–f3) of the signal transmission rate will become uncertain because a so-called "variable pitch mode" is sometimes employed where the signals are transmitted with frequency deviations of ±12.5% from the a predetermined transmission rate. In counting the number of the longest pulse width pattern 3T in the SPDIF signal by use of clock pulses of a fixed frequency fc, there will occur no problem as long as the threshold values and fixed clock frequency fc are appropriately set in correspondence with such frequency deviations; otherwise, the signal transmission rate information and state information may not match each other. Even in such a case, erroneous operation of the system can be properly dealt with by clearly indicating the disagreement between the two information via the state confirmation flag f4.

The transmission rate identification and data extraction circuitry RS may also be arranged to not separately identify all of the possible transmission rates Fs of the input SPDIF signal. Namely, the transmission rate identification and data extraction circuitry RS may only determine whether the actual transmission rate Fs is 32 kHz or other rates; more specifically, even where the 48 kHz and 44.1 kHz transmission rates are not clearly distinguished from each other, the transmission rate information can be extracted from the "C" bits as long as the "C" bit data can be detected accurately.

[Organization of Bit-data Extracting Pulse Train]

Figure 8:
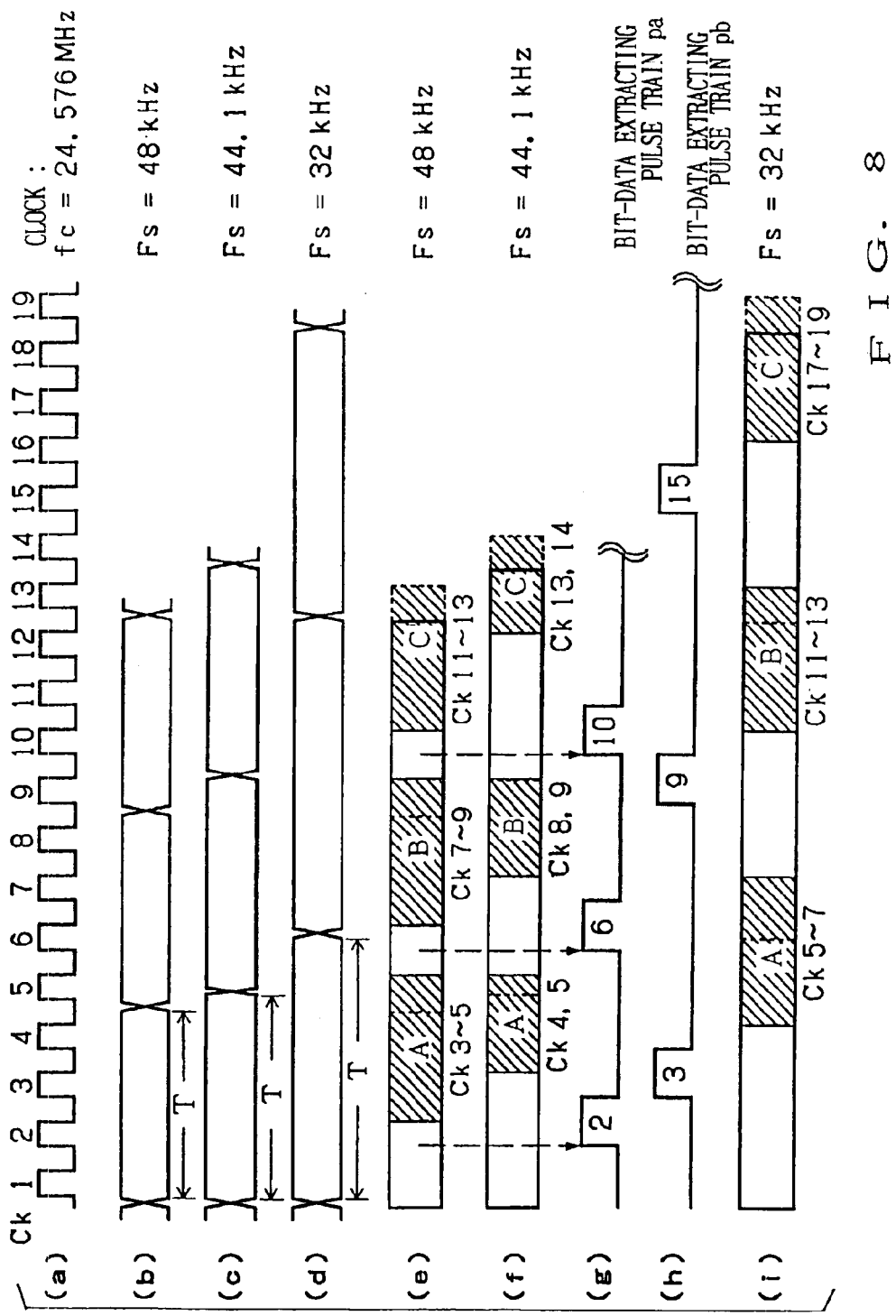
FIG. 8 is a diagram explanatory of an organization of bit-data-extracting pulse trains for use in SPDIF signal reception in accordance with an embodiment of the present invention.

In one embodiment of the present invention, a switch is made between the bit-data extracting pulse trains, as necessary, for receiving SPDIF format signals of any desired transmission rates. FIG. 8 is a diagram explanatory of the bit-data extracting pulse trains to be used in receiving such SPDIF format signals. In FIG. 8, there are illustrated examples of data demodulated with the bit-data extracting pulse trains in a situation where the master clock pulses are asynchronous to the SPDIF signals and have a frequency fc of 24.576 MHz as denoted in column (a) of the figure. In FIG. 8, columns (b) to (d) show lengths of the longest pulse width pattern 3T corresponding to the signal transmission rates Fs of 48 kHz, 44.1 kHz and 32 kHz, respectively.

The master clock pulses in column (a) of FIG. 8 are asynchronous to the SPDIF signals in columns (b)–(d), and the pulse width patterns in the SPDIF signals each have a length corresponding to some multiple (a times=128 times) of the transmission rate Fs. Because the clock frequency fc of 24.576 MHZ employed here is b (512) times as high as the maximum Fsmax (=48 kHz) of the possible signal transmission rates Fs, asynchronousness errors in the range of ±1 Ck would occur depending on whether the master clock pulses of 24.576 MHz (=512 Fsmax) are slightly faster or slower than the frequency "128 Fs" of the SPDIF signal pattern due to a difference in the precision of quartz oscillation, as previously mentioned (see table I of FIG. 3).

Therefore, uncertain regions in the length measurement of the pulse width patterns 1T, 2T and 3T due to the asynchronousness errors would occur as denoted in regions A to C in columns (e) and (f) of FIG. 8. Thus, to accurately measure the length of each of the pulse width patterns, it would suffice to just make arrangements for detecting gaps therebetween. Columns (g) of FIG. 8 shows an example of the bit-data extracting pulse train pa arranged in this manner. The example shows that the necessary bit data extraction and data demodulation can be performed without a need for clear discrimination between the 48 kHz and 44.1 kHz transmission rates, and thus the "C" bit data can be detected in an appropriate manner. Namely, as seen from arrowhead-added broken lines in FIG. 8, for the individual pulse width patterns at the 48 kHz or 44.1 kHz transmission rates, each individual bit (pulse width) can be extracted using the bit-data extracting pulse train pa shown in column (g) of FIG. 8. If a time point triggered in response to detection of an edge or variation point is considered to be time slot 1 of the master clock, the bit-data extracting pulses of the train pa are generated at predetermined timing of time slots 2, 6, 10, . . . as shown in column (g) of FIG. 8. Namely, the bit-data extracting pulse train Pa comprises pulses generated at intervals of four time slots with a phase delayed behind the trigger point by one time slot. Further, as shown in column (h) of FIG. 8, the bit-data-extracting pulses of the other train pb are generated at predetermined timing of time slots 2, 6, 10, . . . . Namely, the bit-data extracting pulse train Pb comprises pulses generated at intervals of six time slots with a phase delayed behind the trigger point by two time slots.

On the other hand, when the signal transmission rate Fs is 32 kHz, the other bit-data extracting pulse train pb as shown in column (h) must be used to extract the individual bits. This is because the uncertainty in the pattern length determination at the 32 kHz transmission rate Fs would occur, for example, in regions A to C shown in column (i) of FIG. 8 which are greatly shifted from those shown in columns (e) and (f).

Arithmetically, the bit-data extracting pulse train pa according to the setting scheme of FIG. 8 can be produced as long as the master clock frequency fc is in a range of about 20 MHz to 27.6 MHz. Further, the two different bit-data-extracting pulse trains pa and pb shown in columns (g) and (h) of FIG. 8 can be produced by resetting, every detection of an edge (variation point), the count value obtained by measuring the pulse-width pattern lengths of the input SPDIF signal with the master clock pulses and then decoding respective positions of the master clock pulses corresponding to these pulse width patterns. Note that in a situation where the system is implemented using a master clock frequency lower than the above-mentioned frequency range, the possible signal transmission rates Fs have to be identified individually, using the above-described transmission rate identifying scheme, so as to organize bit-data extracting pulse trains optimal to the identified signal transmission rates Fs.

[SPDIF Signal Reception Circuitry]

Figure 9:
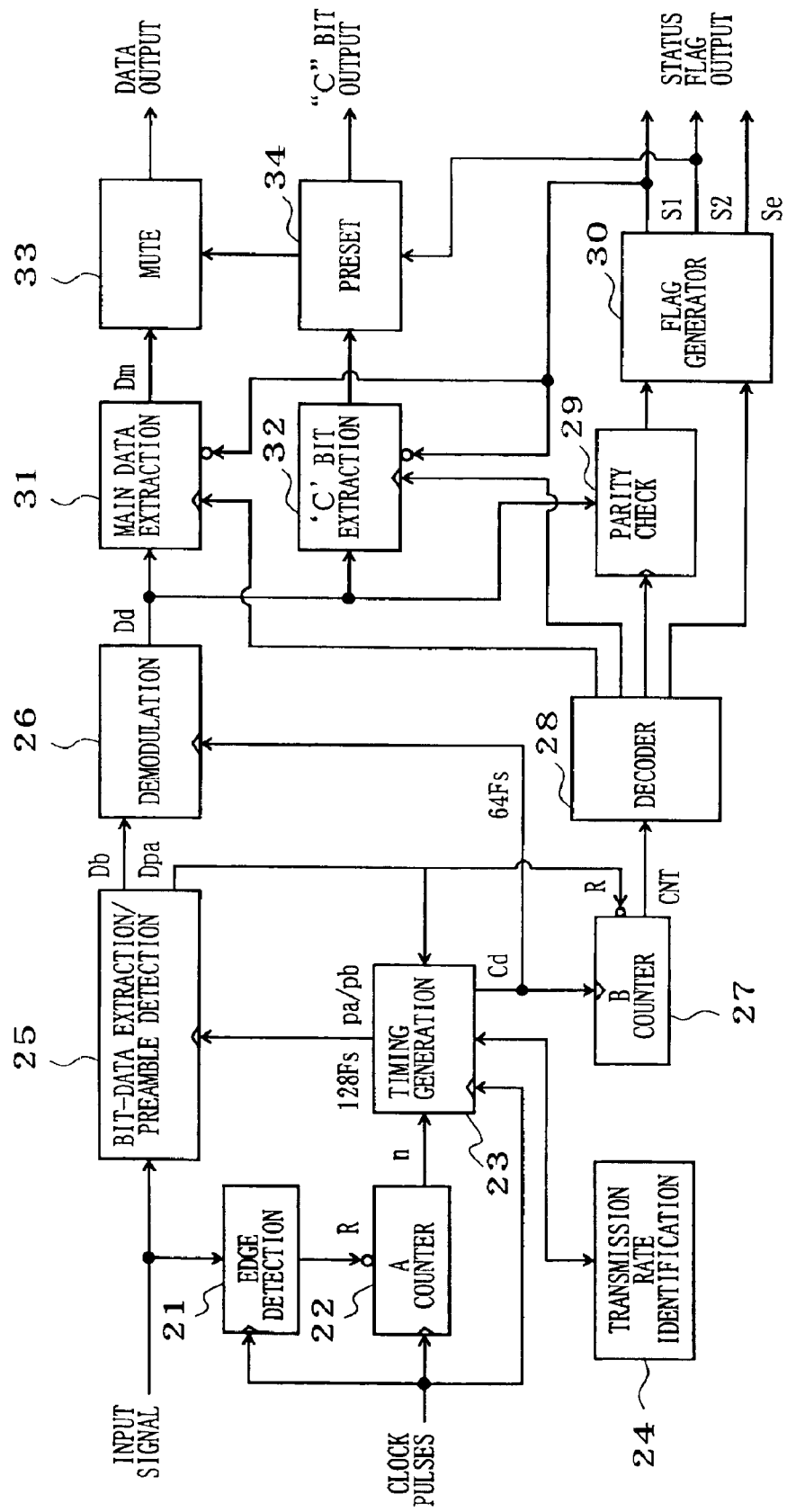
FIG. 9 is a block diagram showing an exemplary organization of one embodiment of SPDIF signal reception circuitry.

According to one embodiment of the present invention, there can be provided high-performance SPDIF signal reception circuitry using the transmission rate identification and bit data extraction scheme based on the forgoing consideration. FIG. 9 is a block diagram showing an embodiment of the high-performance SPDIF signal reception circuitry. As shown, the SPDIF signal reception circuitry includes an edge detection circuit 21, an A counter 22, a timing generation circuit 23, a transmission rate identification circuit 24, a bit data extraction and preamble detection circuit 25, a demodulation circuit 26, a B counter 27, a decoder 28, a parity check circuit (parity checker) 29, a flag generation circuit 30, a PCM main data extraction circuit 31, a "C" bit data extraction circuit 32, etc. The timing generation circuit 23 corresponds generally to the decoder 4 and switching circuit 5 of the transmission rate identification and data extraction circuitry RS shown in FIG. 6, which is designed to enhance the functions of the decoder 4 and switching circuit 5. Further, the transmission rate identification circuit 24 has a function corresponding to the transmission rate identification function performed by the first comparator circuit 3, timing circuit 7, second counter 8, second comparator circuit 9 and output latch circuit 10 (i.e., principal part of the transmission rate identification section RD) of the transmission rate identification and data extraction circuitry RS shown in FIG. 6.

The edge detection circuit 21 detects an edge or variation point of a pulse width pattern of the input SPDIF signal by use of clock pulses Ck having a fixed frequency fc of 24.576 MHz, and gives an edge detection signal to the A counter 22 to rest the counter 22. The A counter 22, similarly to the first counter 2 of FIG. 6, counts a length of a pulse width pattern of the input SPDIF signal starting at the generation time point of the edge detection signal. The count value n output from the A counter is decoded by the timing generation circuit 23, so that the timing generation circuit 23 generates two different bit-data-extracting pulse trains pa and pb corresponding to the 32 kHz signal transmission rate and other transmission rates in the manner as described earlier in relation to FIG. 8.

More specifically, each time an edge of a pulse with pattern of the input SPDIF signal is detected, the timing generation circuit 23 generates the bit-data extracting pulse trains pa and pb having respective predetermined pulse generation timing patterns. Namely, because the bit extracting pulses are generated at predetermined timing as shown in column (g) or (h) of FIG. 8 even when a pulse width pattern edge of the input SPDIF signal is not detected for a while after the trigger is reset in response to the preceding pattern edge, the timing generation circuit 23 can generally track the bit rate of the input SPDIF signal Si. Thus, although the bit-data extracting pulse trains pa and pb differ in the pulse-to-pulse interval, an average pulse rate of 128 Fs is achieved by the timing generation circuit 23 as long as the circuit 23 appropriately tracks the input SPDIF signal Si, and these pulse trains are then given to the bit data extraction and preamble detection circuit 25. The timing generation circuit 23 also divides the frequency of the bit-data extracting pulse trains by two, so as to generate SPDIF-signal demodulating clock pulses Cd of a 64 Fs frequency that are given to the demodulation circuit 26.

The transmission rate identification circuit 24 of FIG. 9 may be arranged and may function in the same manner as the transmission rate identification section RD described above in relation to FIG. 6 and the like. Thus, this transmission rate identification circuit 24 will not be described in detail here to avoid unnecessary duplication. Functions to be performed by the transmission rate identification circuit 24 for identifying the signal transmission rate and generating the bit-data extracting pulse trains pa and pb may be implemented by the functions of the timing generation circuit 23 that decodes the count value n of the A counter 22.

The bit data extraction and preamble detection circuit 25 is arranged to accurately extract data of each individual bit from the input SPDIF signal by use of the bit-data extracting pulse train pa or pb of the 128 Fs frequency generated by the timing generation circuit 23 and also decode, from the extracted data, any one of preamble patterns "B", "M" and "W" located at the beginning of each subframe. Whenever one of such preamble patterns is decoded, the bit data extraction and preamble detection circuit 25 feeds a preamble detection signal Dpa back to the timing generation circuit 23. Also, in accordance with the decoded preamble indicated by the preamble detection signal Dpa, the bit data extraction and preamble detection circuit 25 modifies the generation timing of the SPDIF-signal demodulating clock pulses Cd of the 64 Fs frequency and presets the B counter 27 to a predetermined value.

SPDIF data Db extracted by the bit data extraction and preamble detection circuit 25 is sent to the demodulation circuit 26 for demodulation of the biphase mark modulation. The PCM main data extraction circuit 31 and "C" bit data extraction circuit 32 extract, from the demodulated SPDIF data Db, PCM main data Dm of the left and right channels and "C" bit data, respectively. Further, the parity check circuit (parity checker) 29 calculates, from the demodulated SPDIF data Db, a parity code compliant with the SPDIF format, and then passes the calculated result to the flag generation circuit 30 so that the calculated result can be used by the flag generation circuit 30 as a condition for generating a flag.

Timing of these operations is signaled by the B counter 27 and decoder 28. Namely, by being set each time a preamble signal is detected, the B counter 27 generates a count value signal CNT interpolating the SPDIF subframe by use of the SPDIF-signal demodulating clock pulses Cd of the 64 Fs frequency tracking the input SPDIF signal Si, and the count value signal CNT is decoded by the decoder 28 and passed to the individual circuits 29 to 31 so that the circuits 29 to 31 can be controlled to operate at desired timing.

The important feature of the SPDIF signal reception circuit of the invention resides in the flag generation circuit 30. Namely, the flag generation circuit 30 determines whether the above-described circuits are accurately operating to process the data in proper track of the input SPDIF signal Si, and outputs the results of the determination as first and second status flags S1 and S2 so as to control the output of the main data Dm and "C" bit data.

The first status flag S1 represents results of the transmission rate identification by the transmission rate identification circuit 24, bit data extraction and preamble detection by the bit data extraction and preamble detection circuit 25 and demodulation by the demodulation circuit 26 (i.e., whether or not the reception circuitry is in a stable phase-locked operation mode appropriately tracking the input SPDIF signal Si). When all of these determination results have been found to be normal and the first status flag S1 has turned into a locked state, PCM main data extraction circuit 31 and "C" bit data extraction circuit 32 start operating.

The second status flag S2 is set to turn into a status locked state only after the "C" bit data extraction by the detection circuit 32 is completed. When the second status flag S2 is in an unlocked state, i.e. before the "C" bit data have been detected accurately, the PCM main data Dm output from the main data extraction circuit 31 are muted by a mute circuit 33, and the C bit data to be output is made to be treated as incorrect data, without fail, by a fixed value being preset via a preset circuit 34. Once the "C" bit data have been detected accurately and the second status flag S2 has turned into the locked state, the compulsory presetting of the predetermined "C" bit by the preset circuit 34 is canceled so that the "C" bit data are output from the "C" bit detection circuit 1, and at the same time, the muting of the PCM main data by the mute circuit 33 is canceled so that the main data are output from the circuit 33.

Further, the flag generation circuit 30 compares the signal transmission rate Fs identified by the transmission rate identification circuit 24 and transmission rate information obtained by decoding the "C" bit signal detected by the "C" bit data extraction circuit 32. If the compared two transmission rates do not match each other, then the flag generation circuit 30 generates an error flag Se as a third status flag.

[Flag Generation Process]

Figure 10:
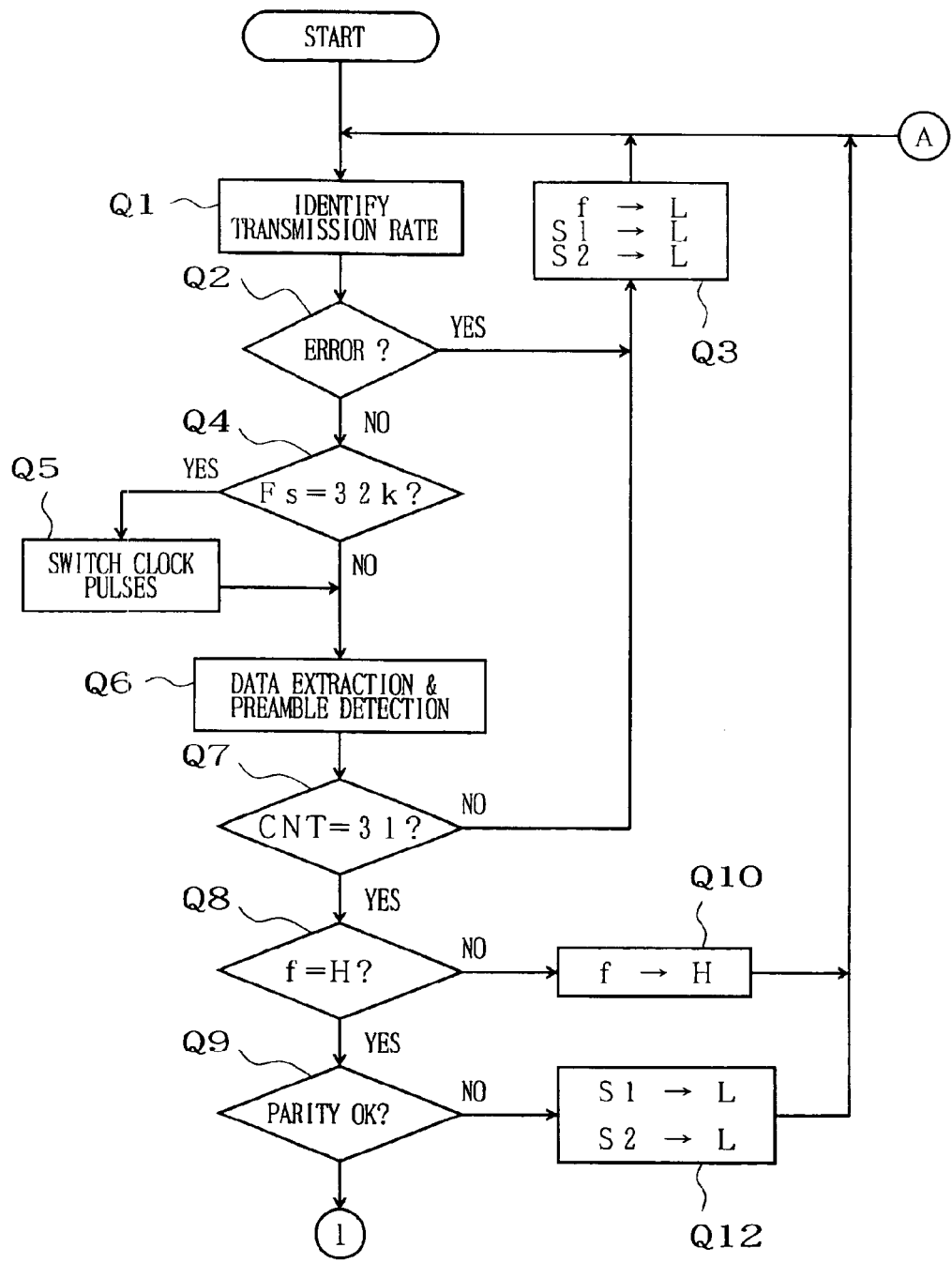
FIG. 10 is a flow chart showing a portion of a flag generation process performed by the SPDIF signal reception circuitry.
Figure 11:
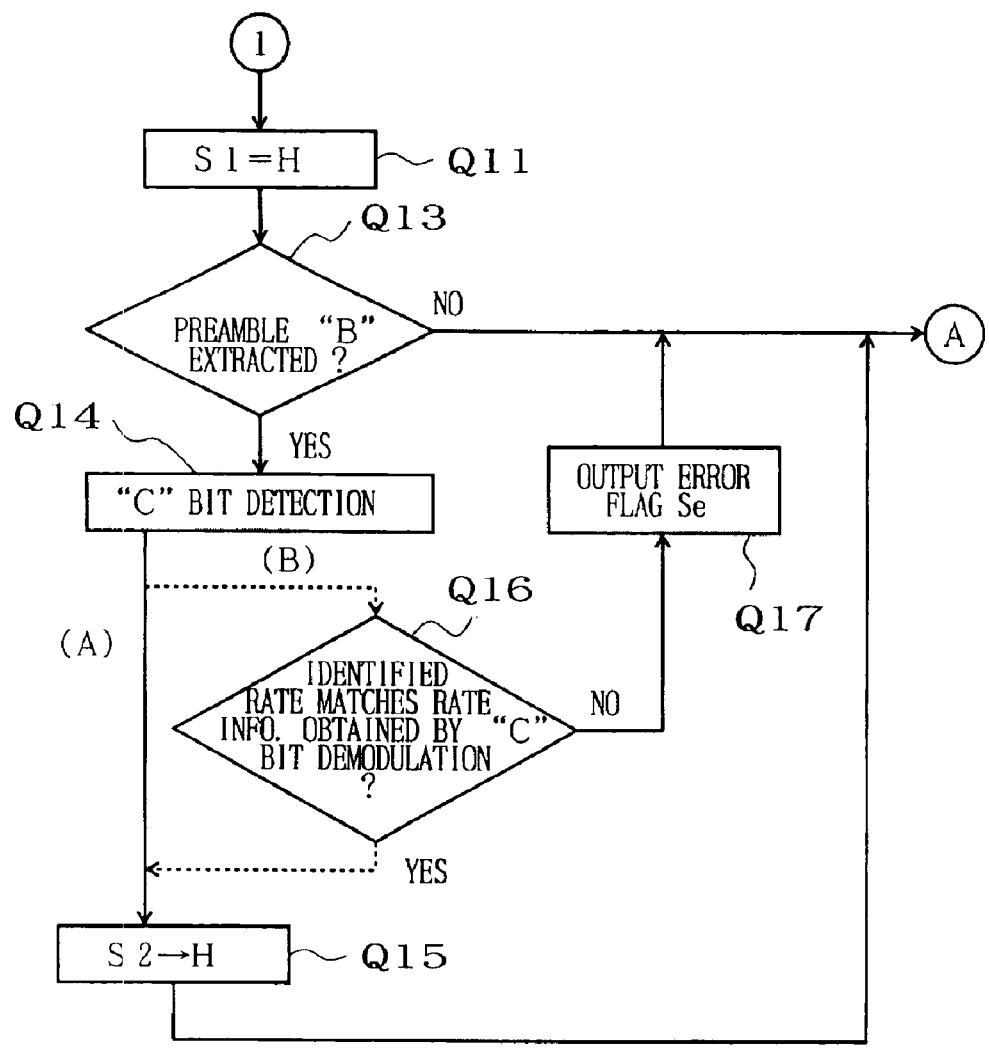
FIG. 11 is a flow chart showing the remaining portion of the flag generation process performed by the SPDIF signal reception circuitry.

FIGS. 10 and 11 show an exemplary step sequence of a flag generation process performed by the SPDIF signal reception circuitry of the present invention. More specifically, FIGS. 10 and 11 are a flow chart explanatory of examples of status determination conditions and operations related thereto which are employed in the flag generation circuit 30 of the SPDIF signal reception circuitry of FIG. 9. In these figures, sign "f" represents a preamble detection flag indicating that a preamble signal has been detected accurately. Operation of step Q1 corresponds to the transmission rate identification operation performed by the transmission rate identification circuit 24, which is similar in contents to the process performed by the transmission rate identification section of FIG. 6 and the like and the transmission rate identification algorithm of FIGS. 2 and 5. Further, the flow chart is presented here in relation to the case where the transmission rate identification circuit 24 is arranged to only determine whether the signal transmission rate Fs is 32 kHz or not.

At next step Q2, a determination is made as to whether there has been caused an error in the transmission rate identification. If a pulse-width pattern length outside the range defined by the longest and shortest pulse-width pattern lengths has been counted by the A counter 22, the transmission rate identification is determined as an error at step Q2, so that the flag generation process moves to step Q3, where the various flags f, S1 and S2 of the flag generation circuit 30 are all set to a Low level to indicate an unlocked state.

If there has been no error in the transmission rate identification as determined at step Q2, the process proceeds to step Q4, where a further determination is made as to whether the identified signal transmission rate Fs is 32 kHz or not. Only when the identified signal transmission rate Fs is 32 kHz, a switch is made between the bit-data extracting pulse trains at step Q5, after which the process moves on to step Q6. In case the identified signal transmission rate Fs is not 32 kHz, the process jumps from step Q4 to step Q6.

The operation of step Q6 corresponds to the bit data extraction and preamble detection by the bit data extraction and preamble detection circuit 25; that is, at step Q6, the data of the individual bits are extracted, using the bit-data extracting pulse train pa or pb of the 128 Fs frequency, from the SPDIF signal modulated on the bit-by-bit basis with the 128 Fs frequency, and preamble pattern "B", "M" or "W" is detected and decoded. Even if the preamble pattern detected at step Q6 is detected by the bit-data-extracting pulse train pa or pb, it is not certain whether or not the detected preamble pattern is in phase with the SPDIF signal, and thus the in-phase condition of the detected preamble pattern must be additionally tested to ensure that the preamble has been detected accurately.

For that purpose, it is further determined at step Q7 whether or not the current count value CNT of the B counter 27 has reached a predetermined threshold value of, for example, "31" indicating a situation where the counter 27 has accurately counted the 32 bits within the SPDIF subframe starting with an initial value "0" and ending with a value "32". If answered in the affirmative at step Q7, a further determination is made as to whether or not a preamble could be decoded properly. In case a preamble has been decoded when the current count value CNT of the B counter 27 is not the predetermined threshold value "31", the flag generation process branches to step Q3, where the various flags f, S1 and S2 of the flag generation circuit 30 are all set to the Low level. If, on the other hand, a preamble has been detected at the correct timing when the current count value CNT of the B counter 27 is the predetermined threshold value "31", the flag generation process proceeds to step Q8.

At step Q8, it is further determined whether or not the preamble detection flag f is currently set at a High level. With an affirmative determination at step Q8, the flag generation process moves on to step Q9; otherwise, the process loops back to step Q1 after setting the preamble detection flag f to the High level at step Q10. If the count value of the B counter 27 and timing when the preamble has been detected coincide with each other, then it is determined at step Q8 that the preamble detection flag f is at the High level, which means that two correct preambles have been detected in succession.

At next step Q9, it is determined whether the parity check performed at this time has yielded an acceptable (OK) result, i.e. whether the demodulation of the subframe containing the second one of the preambles and the result of the parity check based on the demodulated subframe are acceptable, then the process moves on to step Q11 of FIG. 11, where the first status flag S1 is set to the High level so as to present the locked state. If, on the other hand, the parity check has yielded an unacceptable (No Good) result, the process branches to step Q12 (FIG. 10), where the status flags S1 and S2 are each set to the Low level so as to present the unlocked state even if they have been in the locked state up to this stage. After step Q12, the process reverts to step Q1.

If the first status flag S1 is indicating the locked state, the process moves from step Q11 (FIG. 11) to step Q13, where a further determination is made as to whether preamble pattern "B" indicative of the beginning of a block of 192 frames has been extracted. If such preamble pattern "B" has been extracted as determined at step Q3, the process moves further to step Q14 in order to initiate a "C" bit detection mode, but if not, the process reverts to step Q1 (FIG. 10). In other words, when the first status flag S1 is at the Low level, the "C" bit detection is not performed. In an alternative, the "C" bit detection may start with the extraction of preamble pattern "B" at the beginning of the 192-frame block and end when the data of a necessary number of bits have been detected, because basic information is stored in the first 32 frames or so.

When the "C" bit detection has been completed under such conditions at step Q14, the flag generation process according to a first specific example goes to step Q15 as denoted by arrow (A) in order to set the second status flag S2 to the High level to indicate the locked state, after which the process loops back to step Q1.

According to a second specific example, the flag generation process may go from step Q14 to step Q16 as denoted by dotted-line arrow (B). Namely, where the construction shown in FIG. 7 is employed, a comparison is made between the transmission rate information decoded from the "C" bit data extracted by the C" bit data extraction circuit 32 and the individual transmission rates identified by the transmission rate identification circuit 24. If the compared two transmission rates match each other, the second status flag S2 is set to the High level, but if not, the process loops back to step Q1 after generating an error flag at step Q17.

If the compared two transmission rates do not match each other as determined at step Q16, this means that the transmission rate identification has been performed erroneously, the "C" bit detection has been erroneous or an erroneous Fs code was allocated to the "C" bits of the input SPDIF signal. However, an appropriate process should be taken into consideration to deal with such a cause depending on the situation of a specific system to be implemented, and thus it will be more proper if the comparison result indicating the disagreement between the two transmission rates is output as the error flag Se without being used as a condition for the locked state of the second status flag S2.

In summary, the present invention is characterized by the provision of a transmission rate identification section arranged to count the number of the longest pulse-width pattern length 3T in the input SPDIF signal to thereby identify the transmission rate of the SPDIF signal and also arranged to identify a signal of any other format than the SPDIF format, and a section for identifying a locked or unlocked state using, as determination conditions, accurate detection of two preamble patterns in succession and result of parity calculation after demodulation. In the present invention, the data of the "C" bits are detected only when the first status flag is in the locked state. Before a predetermined number of the data of the "C" bits are detected, the system is not judged to be in an ultimate locked state where the second status flag too is set to the locked state is not established, so that the main data are muted.

Therefore, the present invention thus arranged can perform the functions of identifying the transmission rate of the SPDIF signal and distinguishing between the locked state where the bit data can be extracted accurately and the unlocked state where the data bits can not be extracted accurately. Further, because the clock pulses to be used for extracting the individual bit data can be digitally generated with the low frequency clock pulses used for identifying the signal transmission rate (the longest pulse-width pattern length), the present invention can provide a data extraction circuit that is capable of generating bit-data extracting pulse trains with the low-frequency clock pulses to thereby accurately detect the data bits without using an analog PLL. As a result, the present invention can effectively reduce power consumption in actual circuitry and ensure sufficient operational margins by the use of the low frequency and operational stability by the use of the digital circuit structure.

Further, as described above, the present invention is arranged to identify a transmission rate of a digital interface signal by examining an optionally selected one of peculiar pulse width patterns; in such a case, the transmission rate is identified not only by measuring a length of the selected pulse width pattern in accordance with the predetermined first threshold values C1x but also by counting the number of detections of the predetermined pulse width pattern within the predetermined measuring time period Tc. Thus, the transmission rate identification can be performed using a lower fixed frequency.

Furthermore, because the clock pulses to be used for extracting the individual bit data can be digitally generated with the low frequency clock pulses used for identifying the signal transmission rate, the present invention can provide an appropriate data extraction circuit without using an analog PLL. As a result, the present invention can effectively reduce power consumption in actual circuitry and ensure sufficient operational margins by the low frequency and operational stability by the digital circuit structure.

What is claimed is:

1. An interface apparatus for receiving digital data serially transmitted in a predetermined format where predetermined identification data are incorporated in serial digital data in predetermined cycles, said interface apparatus comprising:
   a pulse train generation circuit that generates a bit-data extracting pulse train, having predetermined pulse generation patterns, in response to detection of a variation in received serial digital data;
   a bit-location information generation circuit that, on the basis of the bit-data extracting pulse train generated by said pulse train generation circuit, generates bit location information specifying each bit location in the received serial digital data;
   a bit-data extraction circuit that extracts data of each bit from the received serial digital data by use of the generated bit-data extracting pulse train;
   an identification data detection circuit that detects the identification data from the data extracted by said bit-data extraction circuit;
   a control device that is adapted to set a locked state at least on condition that the bit location information generated by said bit-location information generation circuit when the identification data is detected by said identification data detection circuit corresponds to a predetermined bit location, and generate a lock status signal in correspondence with setting of the locked state; and
   a data reproduction circuit that, on the basis of the data of each bit extracted by said bit-data extraction circuit and with reference to the bit location information, reproduces the received serial digital data on condition that the lock status signal is indicative of the locked state;
   wherein said control device sets the locked state on further condition that two of the identification data have been detected in succession and a parity calculation for a subframe immediately preceding detection of a second one of the two identification data has yielded a predetermined result.

2. An interface apparatus as claimed in claim 1 wherein the bit location information generated by said bit-location information generation circuit is modified in response to detection of the identification data by said identification data detection circuit.

3. An interface apparatus as claimed in claim 1 wherein said pulse train generation circuit generates the bit-data extracting pulse train having pulse generation patterns corresponding to a serial transmission rate.

4. An interface apparatus as claimed in claim 1 wherein said bit-location information generation circuit includes a counter for counting pulses in the bit-data extracting pulse train generated by said pulse train generation circuit, and wherein the bit location information specifying each bit location is sequentially generated on the basis of a changing count value of said counter.

5. An interface apparatus as claimed in claim 1 wherein the predetermined format is in an SPDIF signal format, and the identification data is preamble data for each subframe of an SPDIF signal.

6. An interface apparatus for receiving digital data serially transmitted in a predetermined format where predetermined identification data are incorporated in serial digital data in predetermined cycles, said interface apparatus comprising:
   a pulse train generation circuit that generates a bit-data extracting pulse train, having predetermined pulse generation patterns, in response to detection of a variation in received serial digital data;

a bit-location information generation circuit that, on the basis of the bit-data extracting pulse train generated by said pulse train generation circuit, generates bit location information specifying each bit location in the received serial digital data;

a bit-data extraction circuit that extracts data of each bit from the received serial digital data by use of the generated bit-data extracting pulse train;

an identification data detection circuit that detects the identification data from the data extracted by said bit-data extraction circuit;

a control device that is adapted to set a locked state at least on condition that the bit location information generated by said bit-location information generation circuit when the identification data is detected by said identification data detection circuit corresponds to a predetermined bit location, and generate a lock status signal in correspondence with setting of the locked state; and a data reproduction circuit that, on the basis of the data of each bit extracted by said bit-data extraction circuit and with reference to the bit location information, reproduces the received serial digital data on condition that the lock status signal is indicative of the locked state wherein said identification data detection circuit includes a circuit for detecting a longest pulse width pattern in the detected identification data, a transmission rate of the received serial digital data is identified on the basis of the longest pulse width pattern in the detected identification data, and said pulse train generation circuit generates the bit-data extracting pulse train having pulse generation patterns corresponding to the identified transmission rate of the received serial digital data.

7. An interface apparatus as claimed in claim 6 wherein said data reproduction circuit extracts channel status bits from the digital data reproduced thereby and obtains information indicative of a transmission rate from the extracted channel status bits, and wherein said control device is further adapted to generate a second lock status signal on condition that the information indicative of the transmission rate has been obtained from the extracted channel status bits and sets a second locked state in correspondence with generation of the second lock status signal.

8. An interface apparatus as claimed in claim 7 wherein when said second locked state is not set, all of the digital data reproduced by said data reproduction circuit are made invalid.

9. An interface apparatus as claimed in claim 6 wherein identification of the transmission rate of the received serial digital data based on the longest pulse width pattern in the detected identification data is performed by determining whether the transmission rate is 32 kHz or not, and wherein said pulse train generation circuit switches between the pulse generation patterns, depending on whether the identified transmission rate is 32 kHz or not.

10. An interface apparatus as claimed in claim 7 wherein said control device is further adapted to make a comparison between the transmission rate identified on the basis of the longest pulse width pattern in the detected identification data and the transmission rate indicated by the information obtained from the channel status bits, and generate an error signal when a result of the comparison indicates disagreement between the transmission rates.

11. An interface apparatus as claimed in claim 6 wherein the predetermined format is in an SPDIF signal format, and the identification data is preamble data for each subframe of an SPDIF signal.

12. A method for receiving digital data serially transmitted in a predetermined format where predetermined identification data are incorporated in serial digital data in predetermined cycles, said method comprising the steps of:

generating a bit-data extracting pulse train, having predetermined pulse generation patterns, in response to detection of a variation in received serial digital data;

generating bit location information specifying each bit location in the received serial digital data, on the basis of the generated bit-data extracting pulse train;

extracting data of each bit from the received serial digital data by use of the generated bit-data extracting pulse train;

detecting the identification data from the data extracted by said step of extracting;

setting a locked state at least on condition that the bit location information generated by said step of generating bit location information when the identification data is detected by said step of detecting identification data corresponds to a predetermined bit location, and generating a lock status signal in correspondence with setting of the locked state; and reproducing, on the basis of the data of each bit extracted by said step of extracting and with reference to the bit location information, the received serial digital data on condition that the lock status signal is indicative of the locked state wherein said step of setting sets the locked state on further condition that two of the identification data have been detected in succession and a parity calculation for a subframe immediately preceding detection of a second one of the two identification data has yielded a predetermined result.

13. A method as claimed in claim 12 wherein the bit location information generated by said step of generating bit location information is modified in response to detection of the identification data by said step of detecting identification data.

14. A method for receiving digital data transmitted at any one of a plurality of predetermined transmission rates and identifying the transmission rate of the received digital data, identification data of peculiar patterns being incorporated in the transmitted digital data repetitively in predetermined cycles, an actual time length of the predetermined cycles depending on the transmission rate, the peculiar patterns being in the form of data patterns having a plurality of types of pulse-width pattern lengths, said method comprising the steps of:

measuring the pulse-width pattern lengths of individual ones of the data patterns present in the received digital data, by use of predetermined clock pulses;

detecting, from among the pulse-width pattern lengths measured by said step of measuring, a predetermined type of pulse-width pattern length present in the peculiar patterns and extracting the peculiar patterns in accordance with detection of the predetermined type of pulse-width pattern length, to thereby detect the identification data;

calculating a number of detections of the identification data within a predetermined time period; and identifying the transmission rate of the received digital data on the basis of the number of detections of the identification data and a measured value of the predetermined type of pulse-width pattern length.

15. A method as claimed in claim 14 wherein calculation of the number of detections of the identification data by said step of calculating is reset, when a pulse-width pattern length outside a predetermined criterion is detected by said step of measuring.

16. A machine-readable storage medium containing a group of instructions to cause said machine to implement a method for receiving digital data transmitted at any one of a plurality of predetermined transmission rates and identifying the transmission rate of the received digital data, identification data of peculiar patterns being incorporated in the transmitted digital data repetitively in predetermined cycles, an actual time length of the predetermined cycles depending on the transmission rate, the peculiar patterns being in the form of data patterns having a plurality of types of pulse-width pattern lengths, said method comprising the steps of:

measuring the pulse-width pattern lengths of individual ones of the data patterns present in the received digital data, by use of predetermined clock pulses;

detecting, from among the pulse-width pattern lengths measured by said step of measuring, a predetermined type of pulse-width pattern length present in the peculiar patterns and extracting the peculiar patterns in accordance with detection of the predetermined type of pulse-width pattern length, to thereby detect the identification data;

calculating a number of detections of the identification data within a predetermined time period; and identifying the transmission rate of the received digital data on the basis of the number of detections of the identification data and a measured value of the predetermined type of pulse-width pattern length.

17. An interface apparatus adapted to receive digital data transmitted at any one of a plurality of predetermined transmission rates and identify the transmission rate of the received digital data, identification data of peculiar patterns being incorporated in the transmitted digital data repetitively in predetermined cycles, an actual time length of the predetermined cycles depending on the transmission rate, the peculiar patterns being in the form of data patterns having a plurality of types of pulse-width pattern lengths, said interface apparatus comprising:

a measurement circuit for measuring the pulse-with pattern lengths of individual ones of the data patterns present in the received digital data, by use of predetermined clock pulses; and a control device coupled with said measurement circuit and adapted to:

detect, from among the pulse-width pattern lengths measured by said measurement circuit, a predetermined type of pulse-width pattern length present in the peculiar patterns and extract the peculiar patterns in accordance with detection of the predetermined type of pulse-width pattern length, to thereby detect the identification data;

calculate a number of detections of the identification data within a predetermined time period; and identify the transmission rate of the received digital data on the basis of the number of detections of the identification data and a measured value of the predetermined type of pulse-width pattern length.

18. A method for receiving digital data serially transmitted in a predetermined format where predetermined identification data are incorporated in serial digital data in predetermined cycles, said method comprising the steps of:

generating a bit-data extracting pulse train, having predetermined pulse generation patterns, in response to detection of a variation in received serial digital data;

generating bit location information specifying each bit location in the received serial digital data, on the basis of the generated bit-data extracting pulse train;

extracting data of each bit from the received serial digital data by use of the generated bit-data extracting pulse train;

detecting the identification data from the data extracted by said step of extracting;

setting a locked state at least on condition that the bit location information generated by said step of generating bit location information when the identification data is detected by said step of detecting identification data corresponds to a predetermined bit location, and generating a lock status signal in correspondence with setting of the locked state; and reproducing, on the basis of the data of each bit extracted by said step of extracting and with reference to the bit location information, the received serial digital data on condition that the lock status signal is indicative of the locked state, wherein said step of detecting the identification data includes a step of detecting a longest pulse with pattern in the detected identification data, a transmission rate of the received serial digital data is identified on the basis of the longest pulse width pattern in the detected identification data, and said step of generating a bit-data extracting pulse train generates the bit-data extracting pulse train having pulse generation patterns corresponding to the identified transmission rate of the received serial digital data.

* * * * *